US011070796B2

United States Patent
Hung et al.

(10) Patent No.: US 11,070,796 B2
(45) Date of Patent: Jul. 20, 2021

(54) ULTIMATE MOTION VECTOR EXPRESSION BASED PRUNING FOR VIDEO CODING

(71) Applicant: QUALCOMM Incorporated, San Diego, CA (US)

(72) Inventors: Chao-Hsiung Hung, San Diego, CA (US); Chun-Chi Chen, San Diego, CA (US); Wei-Jung Chien, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 7 days.

(21) Appl. No.: 16/584,225

(22) Filed: Sep. 26, 2019

(65) Prior Publication Data

US 2020/0107017 A1  Apr. 2, 2020

Related U.S. Application Data

(60) Provisional application No. 62/738,771, filed on Sep. 28, 2018.

(51) Int. Cl.
*H04N 19/105* (2014.01)
*H04N 19/176* (2014.01)
(Continued)

(52) U.S. Cl.
CPC ........ *H04N 19/105* (2014.11); *H04N 19/132* (2014.11); *H04N 19/139* (2014.11); *H04N 19/176* (2014.11)

(58) Field of Classification Search
CPC .. H04N 19/139; H04N 19/105; H04N 19/132; H04N 19/176; H04N 19/52
See application file for complete search history.

(56) References Cited

U.S. PATENT DOCUMENTS

| 10,268,901 | B2 * | 4/2019 | Garud | G06K 9/00791 |
| 2018/0359483 | A1 * | 12/2018 | Chen | H04N 19/44 |
| 2020/0068218 | A1 * | 2/2020 | Chen | H04N 19/105 |

FOREIGN PATENT DOCUMENTS

WO    2020047807 A1    3/2020

OTHER PUBLICATIONS

Alshin A., et al., "Description of SDR, HDR and 360° video coding technology proposal by Samsung, Huawei, GoPro, and HiSilicon" "mobile application scenario", 10. JVET Meeting, Apr. 10, 2018-Apr. 20, 2018, San Diego, (The Joint Video Exploration Team of ISO/IEC JTC1lSC291WG11 and ITU-TSG.16), URL: http://phenix.int-evry.fr/jvet/, No. JVET-J0024-v5, Apr. 14, 2018 (Apr. 14, 2018), XP030151190, 119 Pages, section "3.1.4A Ultimate motion vector expression", pp. 53-54, p. 74.

(Continued)

*Primary Examiner* — Neil R Mikeska
(74) *Attorney, Agent, or Firm* — Espartaco Diaz Hidalgo

(57) ABSTRACT

A video encoder and video decoder are configured to perform an ultimate motion vector expression (UMVE)-based pruning method which is used to prune motion vectors in a motion vector candidate list. The video encoder and video decoder may add one or more motion vector candidates to a candidate list for motion vector prediction for a current block of the video data, determine whether to add a next motion vector candidate to the candidate list based on a UMVE candidate of a respective candidate of the one or more candidates, and encode/decode the current block of the video data using the candidate list.

21 Claims, 15 Drawing Sheets

(51) Int. Cl.
*H04N 19/132* (2014.01)
*H04N 19/139* (2014.01)

(56) References Cited

OTHER PUBLICATIONS

Bross B., et al., "High Efficiency Video Coding (HEVC) Text Specification Draft 10 (for FDIS & Last Call)," 12th Meeting: Geneva, CH, Jan. 14-23, 2013, (Joint Collaborative Team on Video Coding of ISO/IEC JTC 1/SC 291WG 11 and ITU-T SG 16 WP 3); JCTVC-L1003_v34, Mar. 19, 2013, 310 pages, please consider section 8.5.3.2.5 on pp. 124 and 125, section 8.5.3.2.6 on pp. 125-128, and section 8.5.3.2.7 on pp. 128 and 129.
Bross B., et al., "Versatile Video Coding (Draft 1)", Joint Video Experts Team (JVET) of ITU-T SG 16 WP 3 and ISO/IEC JTC 1/SC 29/WG 11, 10th Meeting, Apr. 2018, JVET-J1001-v2, 43 pages.
Chen J., et al., "Algorithm description for Versatile Video Coding and Test Model 1 (VTM 1)", Joint Video Exploration Team (JVET) of ITU-T SG 16 WP 3 and ISO/IEC JTC 1/SC 29/WG 11, 10th Meeting: San Diego, US, Apr. 10-20, 2018, Jun. 16, 2018, JVET-J1002-v2, 10 pages, XP030198635, http://phenix.int-evry.fr/jvet/doc_end_user/documents/10_SanDiego/wg11/JVET-J1002-v2.zip.
Chen J., et al., "Algorithm Description of Joint Exploration Test Model 1", Joint Video Exploration Team (JVET) of ITU-T SG 16 WP 3 and ISO/IEC JTC 1/SC 29/WG 11, 1nd Meeting: Geneva, CH, Oct. 19-21, 2015, 27 Pages, JVET-A1001.
Chen J., et al., "Algorithm Description of Joint Exploration Test Model 7 (JEM 7)," 7th Meeting; Joint Collaborative Team on Video Coding (JCT-VC) of ITU-T SG 16 WP 3 and ISO/IEC JTC 1/SC 291WG 11, No. JVET-G1001v1, Jul. 13-21, 2017, 50 pp.
Chien W-J., (QUALCOMM) et al., "CE4-related: Modification on History-based Mode Vector Prediction", 12. JVET Meeting, Oct. 3, 2018-Oct. 12, 2018, Macao, (The Joint Video Exploration Team of ISO/IEC JTC1/SC29/WG11 and ITU-T SG.16), No. JVET-L0401, Oct. 5, 2018 (Oct. 5, 2018), XP030194900, 5 Pages, Retrieved from the Internet: URL: http://phenix.int-evry.fr/jvet/doc_end_user/documents/12_Macao/wg11/JVET-L0401-v 4.zip JVET-L0401_r3.docx [retrieved on Oct. 5, 2018] abstract sections 1-2.
Ergen S., "ZigBee/IEEE 802.15.4 Summary", Sep. 10, 2004, 37 pp.
Hashimoto T., et al., "Non-CE4: Enhanced Ultimate Motion Vector Expression", Joint Video Exploration Team (JVET) of ITU-T SG 16 WP 3 and ISO/IEC JTC 1/SC 29/WG 11, JVET-L0355, Oct. 2018, 5 pages.
IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards committee of the IEEE Computer Society, Dec. 28, 2012, 628 Pages.
International Search Report and Written Opinion—PCT/US2019/053572—ISA/EPO—dated Jan. 8, 2020.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.
ITU-T H.265, "Series H: Audiovisual and Multimedia Systems, Infrastructure of audiovisual services—Coding of moving video, High efficiency video coding," The International Telecommunication Union. Dec. 2016, 664 pp.
Jeong S., et al., "CE4 Ultimate motion vector expression in J0024 (Test 4.2.9)", Joint Video Experts Team (JVET) of ITU-T SG 16 WP 3 and ISO/IEC JTC 1/SC 29/WG 11, JVET-K0115-v1, 11th Meeting: Ljubljana, SI, Jul. 10-18, 2018, 6 pages.
Jeong S., et al., "CE4 Ultimate Motion Vector Expression (Test 4.5.4)", Joint Video Experts Team (JVET) of ITU-T SG 16 WP 3 and ISO/IEC JTC 1/SC 29/WG 11, JVET-L0054, Oct. 3-12, 2018, 5 pages.
Jingya L., et al., "CE4-Related: Improvement on Ultimate Motion Vector Expression", Joint Video Exploration Team (JVET) of ITU-T SG 16 WP 3 and ISO/IEC JTC 1/SC 29/WG 11, JVET-L0408-v2, Oct. 3-12, 2018, 4 pages.
Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012 (Dec. 1, 2012), pp. 1649-1668, XP011487803, ISSN: 1051-8215, DOI: 10.1109/TCSVT.2012.2221191.
Wang Y-K., et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, JCTVC-N1003-v1, 14th Meeting: Vienna, AT, Jul. 25-Aug. 2, 2013, 311 pp.
Yang (Huawei) H., et al., "CE4: Summary Report on Inter Prediction and Motion Vector Coding", 11. JVET Meeting, Jul. 11, 2018-Jul. 18, 2018, Ljubljana, (The Joint Video Exploration Team of ISO/IEC JTC1/SC29/WG11 and ITU-T SG.16), No. JVET-K0024, Jul. 12, 2018, XP030199502, 59 Pages, Retrieved from the Internet: URL: http://phenix.int-avry.fr/jvet/doc_end_user/documents/11_Ljubljana/wg11/JVET-K0024-v4.zip JVET-K0024_r3.docx [retrieved on Jul. 12, 2018] section "2.4.9 CE42.9 in JVET-K0115 (Samsung)" section 2.4.13 CE4.2.13 in JVET K-286.
Zhang (Bytedance) L., et al., "CE4-Related: History-Based Motion Vector Prediction", 11. JVET Meeting, Jul. 11, 2018-Jul. 18, 2018, Ljubljana, (The Joint Video Exploration Team of ISO/IEC JTC1/SC29/WG11 and ITU-TSG.16), No. JVET-K0104-v5, Jul. 18, 2018 (Jul. 18, 2018), 7 Pages, XP030200019, Retrieved from the Internet: URL: http://phenix.int-evry.fr/jvet/doc_end_user/documents/11_Ljubljana/wg11/JVET-K0104-v5.zip JVET-K0104_r4.docx [retrieved on Jul. 18, 2018] abstract sections 1 and 2.
Zhang L., et al., "CE4: History-based Motion Vector Prediction (Test 4.4.7)", Joint Video Experts Team (JVET) of ITU-T SG 16 WP 3 and ISO/IEC JTC 1/SC 29/WG 11, JVET-L0266-v1, Oct. 3-12, 2018, 4 pages.
Zhao (LGE) J., et al., "CE4-related: Simplification to History Based Motion Vector Prediction", 12. JVET M, Oct. 3, 2018-Oct. 12, 2018, Macao, (The Joint Video Exploration Team of ISO/IEC JTC1/SC29/WG11 and ITU-T SG.16) No. JVET-L0309, Sep. 26, 2018 (Sep. 26, 2018), XP030193944, 6 Pages, Retrieved from the Internet: URL:http://phenix.int- evry.fr/jvet/doc_enduser/documents/12_Macao/wg11/JVET-L0309-v2.zip JVET_L0309_ri.docx [retrieved-on Sep. 26, 2018] the whole document.

* cited by examiner

ULTIMATE MOTION VECTOR EXPRESSION BASED PRUNING FOR VIDEO CODING

This application claims the benefit of U.S. Provisional Application No. 62/738,771, filed Sep. 28, 2018, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

This disclosure describes techniques for inter prediction and motion vector candidate list construction for video coding. More specifically, example techniques of this disclosure are related to an ultimate motion vector expression (UMVE)-based pruning method which is used to add and/or prune motion vectors to a motion vector candidate list. UMVE is a technique for expanding the potential values of a motion vector candidate. A video encoder and video decoder may modify an existing motion vector candidate with one or more distances and/or directions to create additional possible motion vector candidates. As such, each motion vector candidate may be expanded into multiple motion vector candidates with various different expressions (e.g., multiple UMVE candidates). In this way, more motion vector candidates are available for motion vector prediction, thus increasing the possibility of using a more accurate motion vector and improving the quality and/or bitrate for the coded video data.

In various examples of the disclosure, a video encoder and video decoder may be configured to determine whether or not to add a motion vector candidate to a candidate list based on a UMVE candidate of a motion vector candidate that is already in the candidate list. In some examples, a UMVE candidate of an existing motion vector candidate in the candidate list may be the same as a new motion vector candidate that is being considered to be added to the candidate list. That is, the new motion vector candidate may be expressed with a UMVE candidate of a previous motion vector candidate. In this example, the video encoder and video decoder are configured to not add the new motion vector candidate to the candidate list.

In other examples, a video encoder may be configured to not calculate UMVE candidates for all motion vector candidates in the list. The video encoder may consider each motion vector candidate in the candidate list in a predetermined order. If a currently considered candidate may be expressed by a UMVE candidate of a previously considered candidate, the video encoder will skip UMVE calculation of the currently considered candidate.

In one example, this disclosure describes an apparatus configured to decode video data, the apparatus comprising a memory configured to store video data, and one or more processors implemented in circuitry and in communication with the memory, the one or more processors configured to add one or more motion vector candidates to a candidate list for motion vector prediction for a current block of the video data, determine whether to add a next motion vector candidate to the candidate list based on an ultimate motion vector expression (UMVE) candidate of a respective candidate of the one or more candidates, and decode the current block of the video data using the candidate list.

In another example, this disclosure describes a method of decoding video data, the method comprising adding one or more motion vector candidates to a candidate list for motion vector prediction for a current block of video data, determining whether to add a next motion vector candidate to the candidate list based on an ultimate motion vector expression (UMVE) candidate of a respective candidate of the one or more candidates, and decoding the current block of video data using the candidate list.

In another example, this disclosure describes an apparatus configured to encode video data, the apparatus comprising a memory configured to store video data, and one or more processors implemented in circuitry and in communication with the memory, the one or more processors configured to add one or more motion vector candidates to a candidate list for motion vector prediction for a current block of the video data, determine whether to add a next motion vector candidate to the candidate list based on an ultimate motion vector expression (UMVE) candidate of a respective candidate of the one or more candidates, and encode the current block of the video data using the candidate list.

In another example, this disclosure describes a method of encoding video data, the method comprising adding one or more motion vector candidates to a candidate list for motion vector prediction for a current block of the video data, determining whether to add a next motion vector candidate to the candidate list based on an ultimate motion vector expression (UMVE) candidate of a respective candidate of the one or more candidates, and encoding the current block of the video data using the candidate list.

The techniques of this disclosure may be applied to any of the existing video codecs, such as HEVC (High Efficiency Video Coding), or be an efficient coding tool in any future video coding standards, such as H.266/Versatile Video Coding (VVC). The details of one or more examples are set forth in the accompanying drawings and the description below. Other features, objects, and advantages will be apparent from the description, drawings, and claims.

DETAILED DESCRIPTION

This disclosure describes techniques for inter prediction and motion vector candidate list construction for video coding. More specifically, example techniques of this disclosure are related to an ultimate motion vector expression (UMVE)-based pruning method which is used to add and prune motion vectors to a motion vector candidate list. UMVE is a technique for expanding the potential values of a motion vector candidate. A video encoder and video decoder may modify an existing motion vector candidate with one or more distances and/or directions to create additional possible motion vector candidates. As such, each motion vector candidate may be expanded into multiple motion vector candidates with various different expressions (e.g., multiple UMVE candidates). In this way, more motion vector candidates are available for motion vector prediction, thus increasing the possibility of using a more accurate motion vector and increasing the quality and/or bitrate for the coded video data.

In various examples of the disclosure, a video encoder and video decoder may be configured to determine whether or not to add a motion vector candidate to a candidate list based on a UMVE candidate of a motion vector candidate that is already in the candidate list. In some examples, a UMVE candidate of an existing motion vector candidate in the candidate list may be the same as a new motion vector candidate that is being considered to be added to the candidate list. That is, the new motion vector candidate may be expressed with a UMVE candidate of a previous motion vector candidate. In this example, the video encoder and video decoder are configured to not add the new motion vector candidate to the candidate list. In this way, redundant or potentially redundant candidates may not be added to candidates lists, thus increasing coder throughput and reducing implementation complexity with minimal to no rate-distortion reduction.

Figure 1:
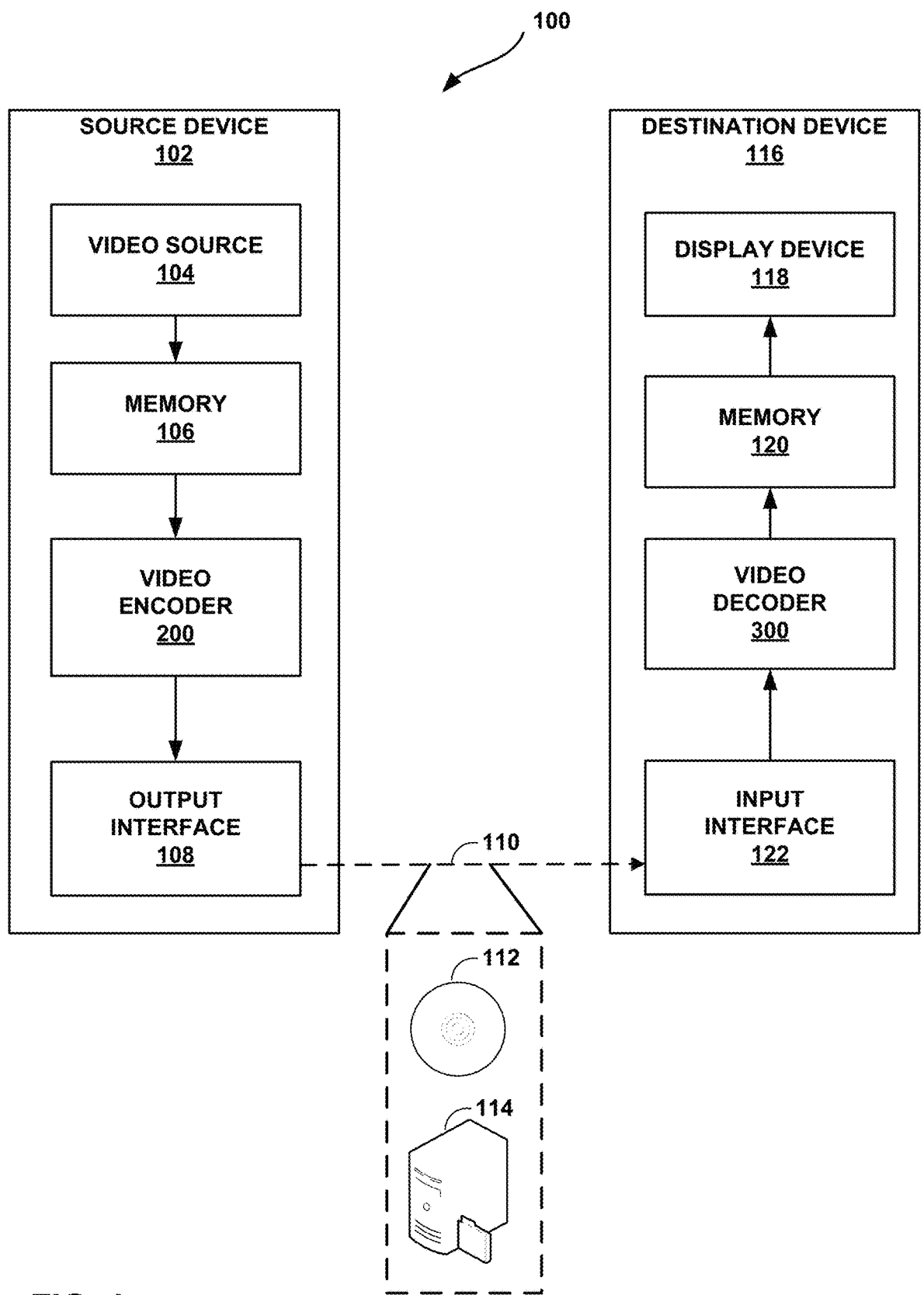
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for ultimate motion vector expression (UMVE)-based pruning. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for UMVE-based pruning. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 116. Similarly, destination device 116 may access encoded data from storage device 116 via input interface 122. Storage device 116 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

This disclosure describes techniques for inter prediction and motion vector candidate list construction for video coding. More specifically, example techniques of this disclosure are related to an ultimate motion vector expression (UMVE)-based pruning method which is used to add and prune motion vectors to a motion vector candidate list. UMVE is a technique for expanding the potential values of a motion vector candidate. A video encoder and video decoder may add one or more distances and/or directions to an existing motion vector candidate to create additional possible motion vector candidates. As such, each motion vector candidate may be expanded into multiple motion vector candidates with various different expression (e.g., multiple UMVE candidates). A UMVE candidate is a candidate created from an existing merge candidate by adding a distance and a direction to the existing merge candidate. In this way, more motion vector candidates are available for motion vector prediction, thus increasing the possibility of using a more accurate motion vector and increasing the quality and/or bitrate for the coded video data.

In various examples of the disclosure, video encoder 200 and video decoder 300 may be configured to determine whether or not to add a motion vector candidate to a candidate list based on a UMVE candidate of a motion vector candidate that is already in the candidate list. In some examples, the UMVE candidate of an existing motion vector candidate in the candidate list may be the same as a new motion vector candidate that is being considered to be added to the candidate list. That is, the new motion vector candidate may be expressed with a UMVE candidate of a previous motion vector candidate. In this example, video encoder 200 and video decoder 300 are configured to not add the new motion vector candidate to the candidate list.

In other examples, video encoder 200 may be configured to not calculate UMVE candidates for all motion vector candidates in the list. The video encoder may consider each motion vector candidate in the candidate list in a predetermined order. If a currently considered candidate may be expressed by a UMVE candidate of a previously considered candidate, the video encoder will skip UMVE calculation of the currently considered candidate.

In one example, video encoder 200 and video decoder 300 may be configured to add one or more motion vector candidates to a candidate list for motion vector prediction for a current block of the video data, determine whether to add a next motion vector candidate to the candidate list based on an ultimate motion vector expression (UMVE) candidate of a respective candidate of the one or more candidates, and decode the current block of the video data using the candidate list. In this way, redundant or likely to be redundant motion vector candidates may not be added to a candidate list, thus increasing the number of unique candidates in the list and potentially improving bit rate and/or distortion of the coded video data.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

The High Efficiency Video Coding (HEVC) standard or ITU-T/H.265 (G. J. Sullivan, J.-R. Ohm, W.-J. Han, T. Wiegand "Overview of the High Efficiency Video Coding (HEVC) Standard," IEEE Transactions on Circuits and Systems for Video Technology, vol. 22, no. 12. pp. 1649-1668, December 2012), including its range extension, multiview extension (MV-HEVC) and scalable extension (SHVC), has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

An HEVC draft specification, and referred to as HEVC WD hereinafter, is available from phenix.int-evry.fr/jct/doc_end_user/documents/14_Vienna/wg11/JCTVC-N1003-v1.zip. The latest version of the Final Draft of International Standard (FDIS) of HEVC can be found in phenix.it-sudparis.eu/jct/doc_end_user/documents/12_Geneva/wg11/JCTVC-L1003-v34.zip.

ITU-T VCEG (Q6/16) and ISO/IEC MPEG (JTC 1/SC 29/WG 11) studied the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (WET) to evaluate compression technology designs proposed by their experts in this area. The JVET first met during 19-21 Oct. 2015. One version of reference software, i.e., Joint Exploration Model 7 (JEM 7) could be downloaded from: https://jvet.hhi.fraunhofer.de/svn/svn_HMJEMSoftware/tags/HM-16.6-JEM-7.2/. An Algorithm description of Joint Exploration Test Model 7 (JEM-7) is described in J. Chen, E. Alshina, G. J.

Sullivan, J.-R. Ohm, J. Boyce, "Algorithm Description of Joint Exploration Test Model 7", JVET-G1001, July 2017.

An early draft for a new video coding standard, referred to as the H.266/Versatile Video Coding (VVC), is available in the document JVET-J1001 "Versatile Video Coding (Draft 1)" by Benjamin Bross, and its algorithm description is available in the document JVET-J1002 "Algorithm description for Versatile Video Coding and Test Model 1 (VTM 1)" by Jianle Chen and Elena Alshina. The techniques of this disclosure, however, are not limited to any particular coding standard.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) and/or VVC.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. In other examples, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to examples of JEM and/or VVC. According to examples of JEM/VVC, a video coder (such as video encoder 200 and video decoder 300) partitions a picture into a plurality of coding tree units (CTUs). Video encoder 200 and video decoder 300 may partition a CTU according to a tree structure, such as a quadtree-binary tree (QTBT) structure. The QTBT structure of examples of JEM/VVC removes the concepts of multiple partition types, such as the separation between CUs, PUs, and TUs of HEVC. A QTBT structure of examples of JEM/VVC may include two levels: a first level partitioned according to quadtree partitioning, and a second level partitioned according to binary tree partitioning. A root node of the QTBT structure corresponds to a CTU. Leaf nodes of the binary trees correspond to coding units (CUs).

In a multi-type tree (MTT) partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left (above-left), or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure and/or MTT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
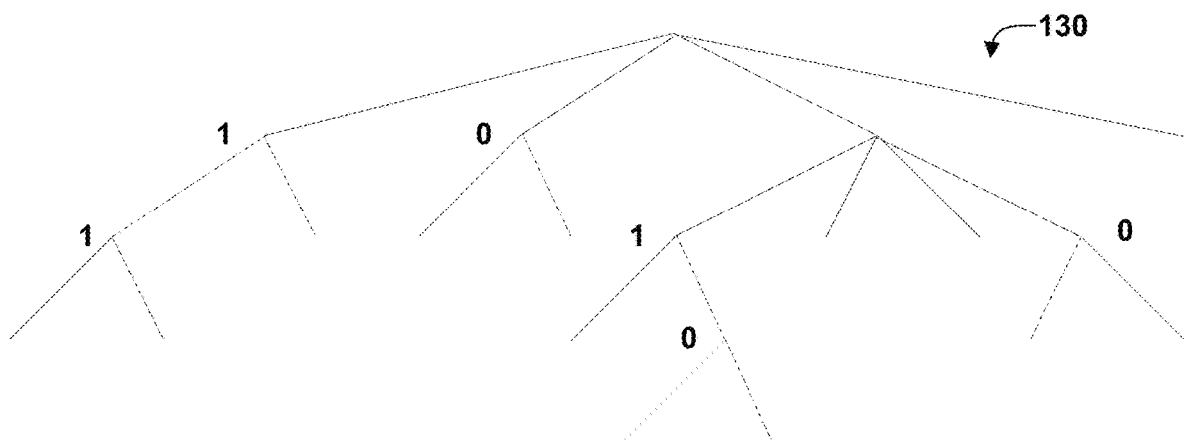
FIGS. 2A and 2B are conceptual diagrams illustrating an example quadtree binary tree (QTBT) structure, and a corresponding coding tree unit (CTU).
Figure 2B:
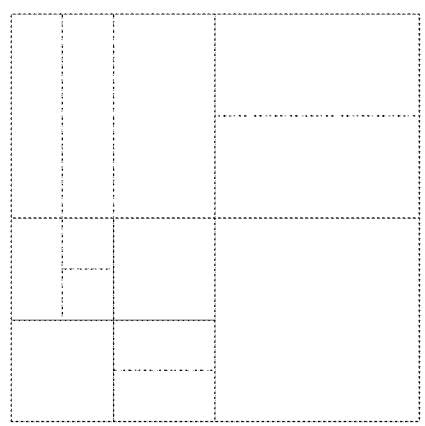

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
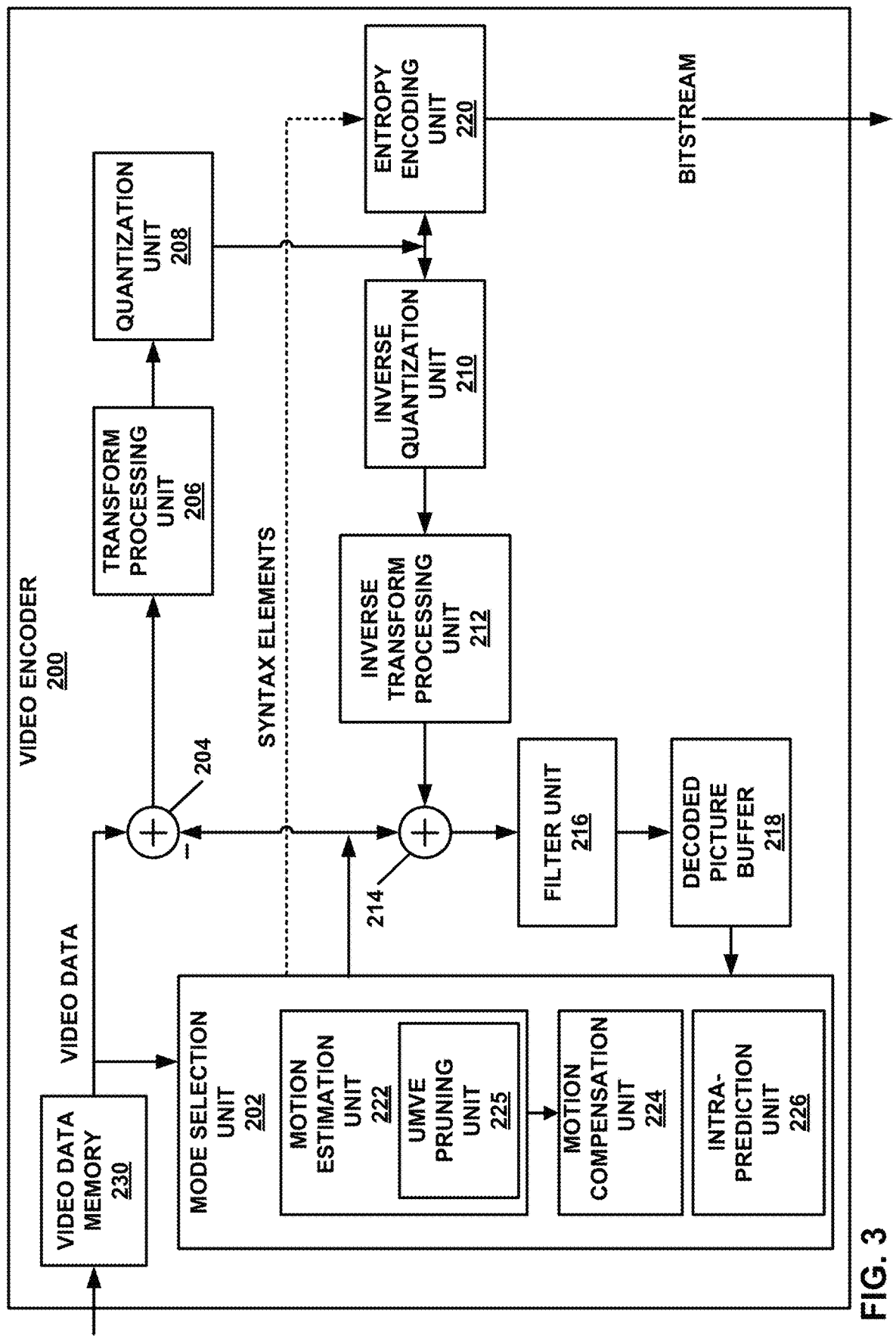
FIG. 3 is a block diagram illustrating an example video encoder that may perform the techniques of this disclosure.

FIG. 3 is a block diagram illustrating an example video encoder 200 that may perform the techniques of this disclosure for candidate list construction. FIG. 3 is provided for purposes of explanation and should not be considered limiting of the techniques as broadly exemplified and described in this disclosure. For purposes of explanation, this disclosure describes video encoder 200 in the context of video coding standards, such as the HEVC video coding standard and the H.266/VVC video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine motion compensation unit (which may be part of motion estimation unit 222 and/or motion compensation unit 224), a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components of video encoder 200 (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

In accordance with the techniques of this disclosure, and as will be explained in more detail below, motion estimation unit 222 may further include a UMVE pruning unit 225 that may be configured to perform the techniques of this disclosure. In some examples, one or more other structural units of video encoder 200 may be configured to perform the techniques of this disclosure in conjunction with UMVE pruning unit 225 or instead of UMVE pruning unit 225. In one example, UMVE pruning unit 225 may be configured to construct one or more candidate lists (e.g., history tables for HMVP and merge candidate lists) based on an ultimate motion vector expression (UMVE) candidate of a candidate to be added and/or the UMVE candidate of a previously-added candidate. In particular, UMVE pruning unit 225 may be configured to add or not add (e.g., prune) candidate lists based on UMVE candidates of various candidates. In this way, redundant or potentially redundant candidates may not be added to candidates lists. In general, UMVE pruning unit 225 may be configured to add one or more motion vector candidates to a candidate list for motion vector prediction for a current block of the video data, determine whether to add a next motion vector candidate to the candidate list based on an ultimate motion vector expression (UMVE) candidate of a respective candidate of the one or more candidates, and encode/decode the current block of the video data using the candidate list.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry and configured to encode a block of video data using inter-prediction and a motion vector, construct a candidate list for motion vector prediction of the motion vector, and determine whether to add a motion vector candidate to the candidate list based on an ultimate motion vector expression (UMVE) candidate for the motion vector candidate.

Figure 4:
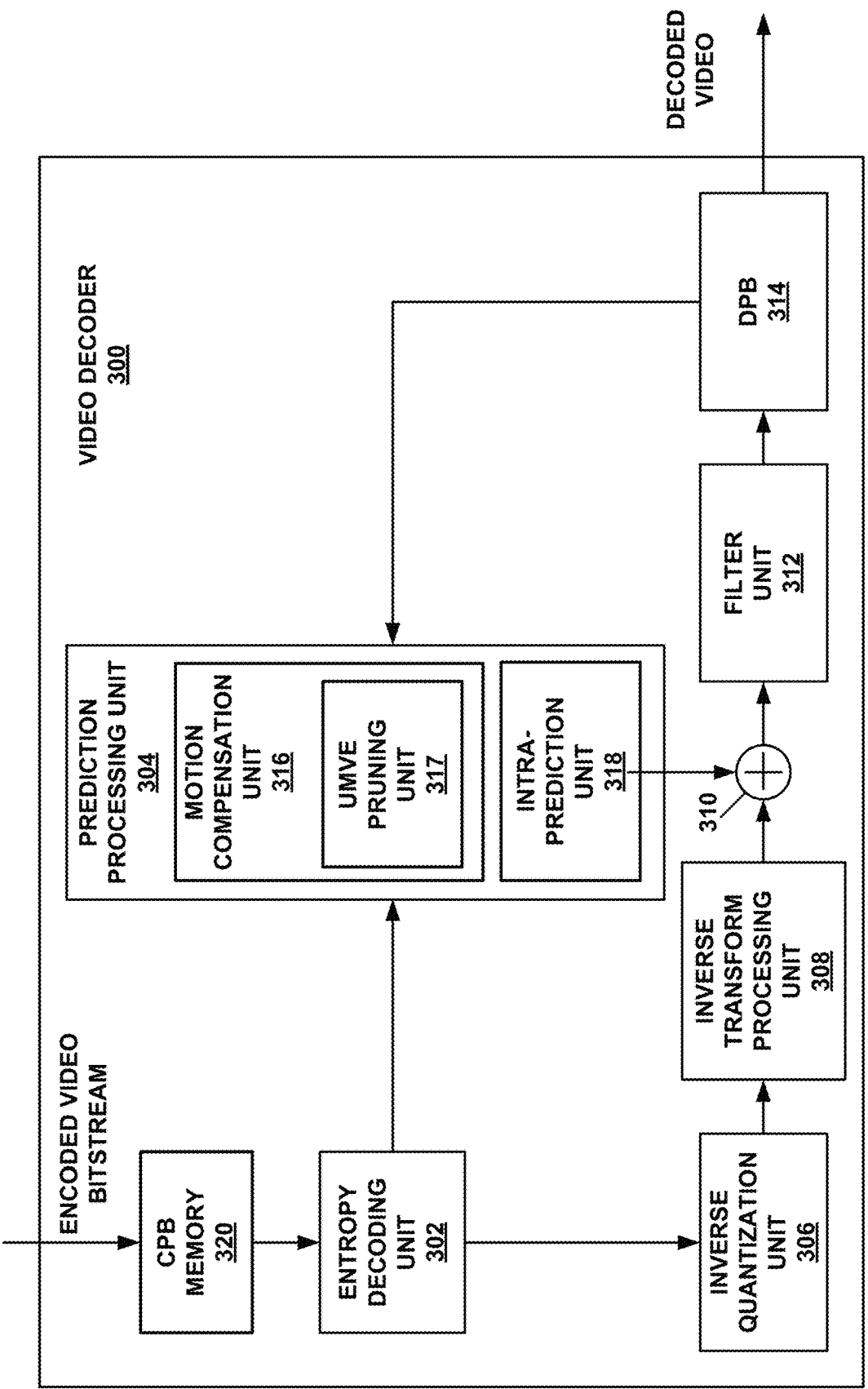
FIG. 4 is a block diagram illustrating an example video decoder that may perform the techniques of this disclosure.

FIG. 4 is a block diagram illustrating an example video decoder 300 that may perform the techniques of this disclosure for candidate list construction. FIG. 4 is provided for purposes of explanation and is not limiting on the techniques as broadly exemplified and described in this disclosure. For purposes of explanation, this disclosure describes video decoder 300 is described according to the techniques of H.266/VVC, JEM, and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

In accordance with the techniques of this disclosure, and as will be explained in more detail below, motion compensation unit 316 may further include a UMVE pruning unit 317 that may be configured to perform the techniques of this disclosure. In some examples, one or more other structural units of video decoder 300 may be configured to perform the techniques of this disclosure in conjunction with UMVE pruning unit 317 or instead of UMVE pruning unit 317. In one example, UMVE pruning unit 317 may be configured to construct one or more candidate lists (e.g., history tables for HMVP and merge candidate lists) based on an ultimate motion vector expression (UMVE) candidate of a candidate to be added and/or the UMVE candidate of a previously-added candidate. In particular, motion compensation unit 316 may be configured to add or not add (e.g., prune) candidate lists based on UMVE candidates of various candidates. In this way, redundant or potentially redundant candidates may not be added to candidates lists. In general, UMVE pruning unit 317 may be configured to add one or more motion vector candidates to a candidate list for motion vector prediction for a current block of the video data, determine whether to add a next motion vector candidate to the candidate list based on an ultimate motion vector expression (UMVE) candidate of a respective candidate of the one or more candidates, and encode/decode the current block of the video data using the candidate list.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to decode a block of video data using inter-prediction and a motion vector, construct a candidate list for motion vector prediction of the motion vector, and determine whether to add a motion vector candidate to the candidate list based on an ultimate motion vector expression (UMVE) candidate for the motion vector candidate.

HEVC CU Structure

The CU structure and motion vector prediction in HEVC will now be discussed. In HEVC, the largest coding unit in a slice is called a coding tree block (CTB) or coding tree unit (CTU). A CTB contains a quad-tree, the nodes of which are coding units.

The size of a CTB can range from 16×16 to 64×64 in the HEVC main profile (although technically 8×8 CTB sizes can be supported). A coding unit (CU) can be the same size of a CTB, and as small as 8×8. Each coding unit is coded with one mode (e.g., inter prediction, intra prediction, etc.). When a CU is inter coded, video encoder 200 and video decoder 300 may further partition the CU into 2 or 4 prediction units (PUs) or just one PU when further partitioning does not apply. When two PUs are present in one CU, they can be half size rectangles or two rectangles that are ¼ or ¾ the size of the CU.

When the CU is inter coded, one set of motion information is present for each PU. In addition, each PU is coded with a unique inter-prediction mode to derive the set of motion information.

Motion Vector Prediction in HEVC

In the HEVC standard, there are two inter prediction modes, named merge (skip is considered as a special case of merge without residual) and advanced motion vector prediction (AMVP) modes, respectively, for a prediction unit (PU). In either AMVP or merge mode, video encoder 200 and video decoder 300 may construct and maintain a motion vector (MV) candidate list of multiple motion vector predictors. Video encoder 200 and video decoder 300 may generate the motion vector(s), as well as reference indices in the merge mode, of the current PU by taking the motion information of one candidate from the MV candidate list.

In HEVC, the MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, video encoder 200 and video decoder 300 are configured to use the reference pictures for the prediction of the current blocks. In addition, video encoder 200 and video decoder 300 are configured to determine the motion vector associated with the merge index. However, under AMVP mode, for each potential prediction direction from either list 0 or list 1, video encoder 200 explicitly signals a reference index, together with an MV predictor (MVP) index to the MV candidate list, since the AMVP candidate contains only a motion vector. In AMVP mode, the predicted motion vectors can be further refined.

As can be seen above, a merge candidate corresponds to a full set of motion information while an AMVP candidate contains just one motion vector for a specific prediction direction and reference index. The candidates for both modes are derived similarly from the same spatial and temporal neighboring blocks.

Spatial Neighboring Candidates

Figure 5B:
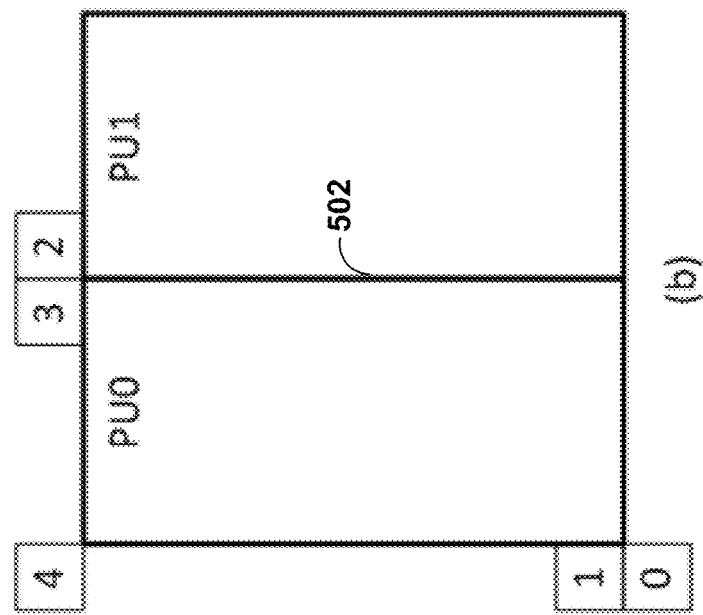
FIG. 5B is a conceptual diagram showing spatial neighboring candidates for advanced motion vector prediction (AMVP) mode.
Figure 5A:
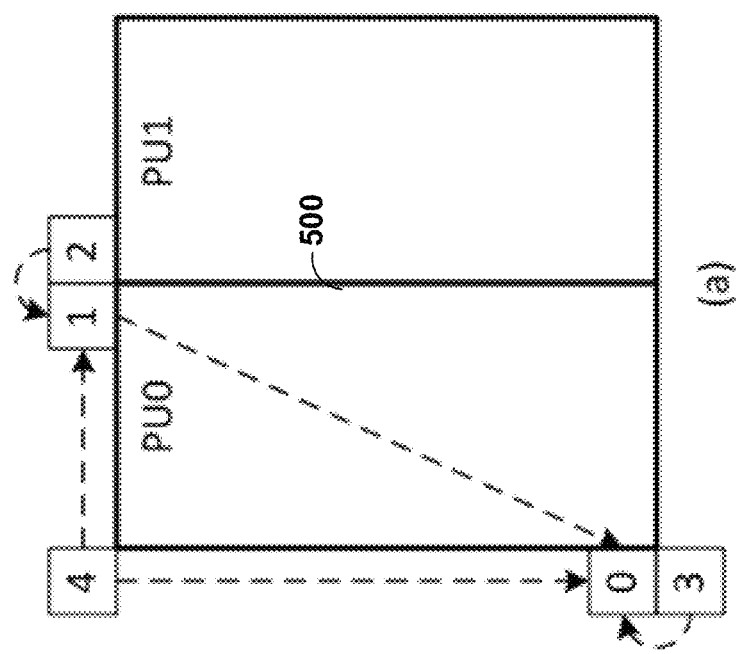
FIG. 5A is a conceptual diagram showing spatial neighboring candidates for merge mode.

In HEVC, video encoder 200 and video decoder 300 may derive spatial MV candidates from the neighboring blocks, as shown in FIG. 5A and FIG. 5B, for a specific PU ($PU_0$), although the techniques for generating the candidates from the blocks differ for merge and AMVP modes.

FIG. 5A is a conceptual diagram showing spatial neighboring candidates of block 500 for merge mode. FIG. 5B is a conceptual diagram showing spatial neighboring candidates of block 502 for AMVP mode. In merge mode, video encoder 200 and video decoder 300 may derive up to four spatial MV candidates in the order shown in FIG. 5A. The order is the following: a left block (0, A1), an above block (1, B1), an above-right block (2, B0), a below-left block (3, A0), and an above-left (4, B2) block.

In AMVP mode, video encoder 200 and video decoder 300 may divide the neighboring blocks into two groups: a left group including blocks 0 and 1, and an above group include blocks 2, 3, and 4, as shown in FIG. 5B. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, video encoder 200 and video decoder 300 may scale the first available candidate to form the final candidate. Thus, the temporal distance differences can be compensated.

Temporal Motion Vector Prediction in HEVC

Video encoder 200 and video decoder 300 may be configured to add a temporal motion vector predictor (TMVP) candidate, if enabled and available, into the MV candidate list after spatial motion vector candidates. The process of motion vector derivation for a TMVP candidate is the same for both merge and AMVP modes. However, the target reference index for the TMVP candidate in the merge mode is set to 0.

The primary block location for TMVP candidate derivation is the bottom right block outside of the collocated PU. This bottom right blocks is shown in FIG. 6A as block 600 (T). Using this location for TMVP candidate derivation compensates the bias to the above and left blocks used to generate spatial neighboring candidates. However, if block 600 is located outside of the current CTB row (e.g., at block 602) or motion information is not available, video encoder 200 and video decoder 300 substitutes block 600 with a center block 604 of the PU 606 (PU0).

Video encoder 200 and video decoder 300 may derive a motion vector for the TMVP candidate from the co-located PU of the co-located picture, indicated in the slice level (e.g., in a slice header). The motion vector for the co-located PU is called the collocated MV.

Figure 6B:
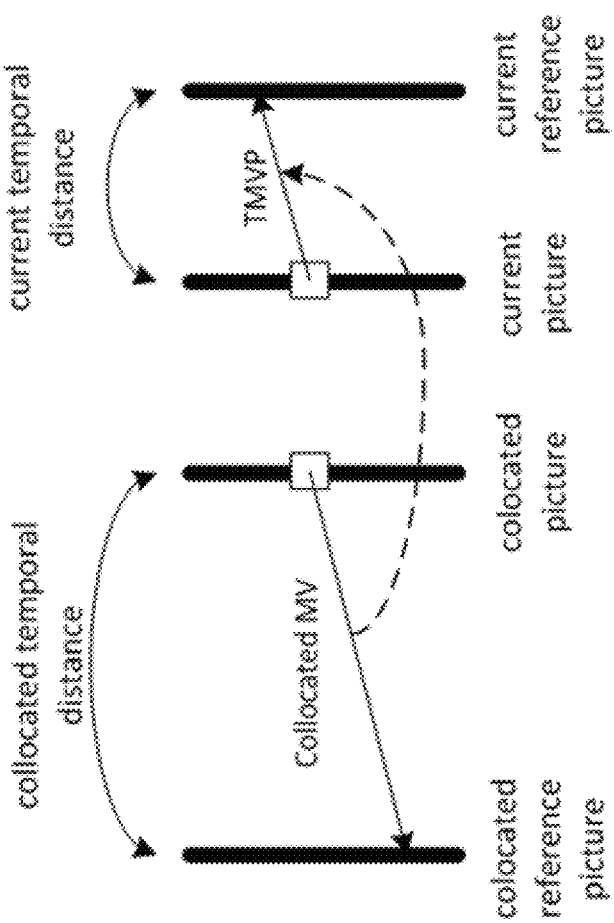
FIG. 6B is a conceptual diagram showing motion vector scaling.
Figure 6A:
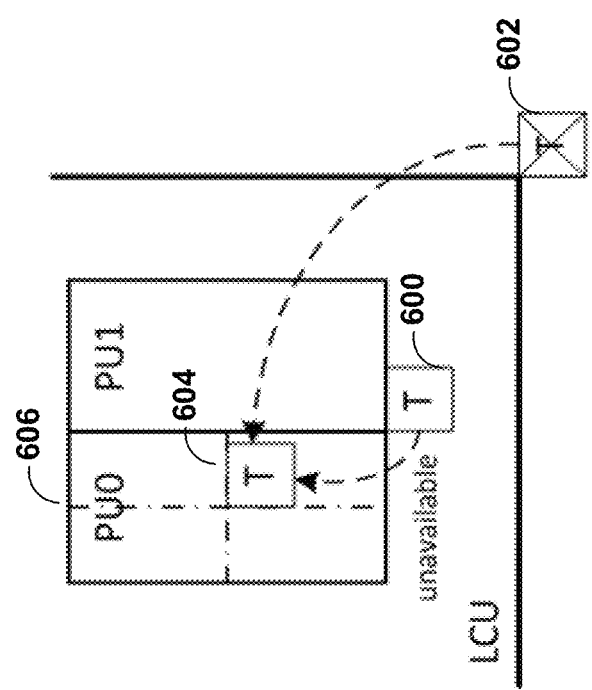
FIG. 6A is a conceptual diagram showing a temporal motion vector predictor candidate.

Similar to temporal direct mode in H.264/AVC, to derive the TMVP candidate motion vector, video encoder 200 and video decoder 300 may scale the co-located MV to compensate the temporal distance differences, as shown in FIG. 6B.

Several additional aspects of merge and AMVP modes in HEVC are described below.

Motion Vector Scaling:

It is assumed that the value of motion vectors is proportional to the distance of pictures in the presentation time. A motion vector associates two pictures: the reference picture and the picture containing the motion vector (namely the containing picture). When a motion vector is utilized to predict the other motion vector, video encoder 200 and video decoder 300 may calculate the distance of the containing picture and the reference picture is based on the Picture Order Count (POC) values.

In some examples, for a motion vector to be predicted, both its associated containing picture and reference picture may be different. Therefore, video encoder 200 and video decoder 300 may calculate a new distance (based on POC) and video encoder 200 and video decoder 300 may scale the motion vector based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Artificial Motion Vector Candidate Generation:

If a motion vector candidate list is not complete (e.g., includes less than a predetermined number of candidates), video encoder 200 and video decoder 300 may generate and insert artificial motion vector candidates at the end of the motion vector candidate list until the motion vector candidate list has the prescribed number of candidates.

In merge mode, there are two types of artificial MV candidates: a combined candidate derived only for B-slices and zero candidates, if the first type does not provide enough artificial candidates.

For each pair of candidates that are already in the candidate list and have the necessary motion information, motion vector candidate may derive bi-directional combined motion vector candidates by a combination of the motion vector of the first candidate referring to a picture in the list 0 and the motion vector of a second candidate referring to a picture in the list 1.

Pruning Process for Candidate Insertion:

Candidates from different blocks may happen to be the same, which decreases the efficiency of a merge/AMVP candidate list. Video encoder 200 and video decoder 300 may apply a pruning process to address this problem. The pruning process compares one candidate against the others in the current candidate list to avoid inserting identical candidates. To reduce the complexity, in some examples, video encoder 200 and video decoder 300 may only apply a limited number of pruning processes instead of comparing each potential candidate with all of the other existing candidates.

Ultimate Motion Vector Expression (UMVE)

Ultimate motion vector expression (UMVE) will now be described. UMVE may be used for either skip or merge modes with a proposed motion vector expression method. Examples of UMVE are described in S. Jeong, M. W. Park, C. Kim, "CE4 Ultimate motion vector expression in JVET-J0024 (Test 4.2.9)", JVET-K0115, July 2018, and S. Jeong, M. W. Park, Y. Piao, M. Park, K. Choi, "CE4 Ultimate motion vector expression (Test 4.5.4)", JVET-L0054, October 2018. Example UMVE techniques re-use a merge candidate in the same manner as VVC. Among the merge candidates, video encoder 200 may be configured to select a candidate. Video encoder 200 may then further expand the merge candidate using the proposed motion vector expression method. UMVE provides a new motion vector expression with simplified signaling. The expression method includes a starting point, a motion magnitude, and a motion direction. This proposed technique uses a merge candidate list as it is. However, in one example, only candidates which are default merge type (e.g., as indicated by MRG_TYPE_DEFAULT_N syntax element) are considered for the expansion techniques of UMVE.

Figure 7:
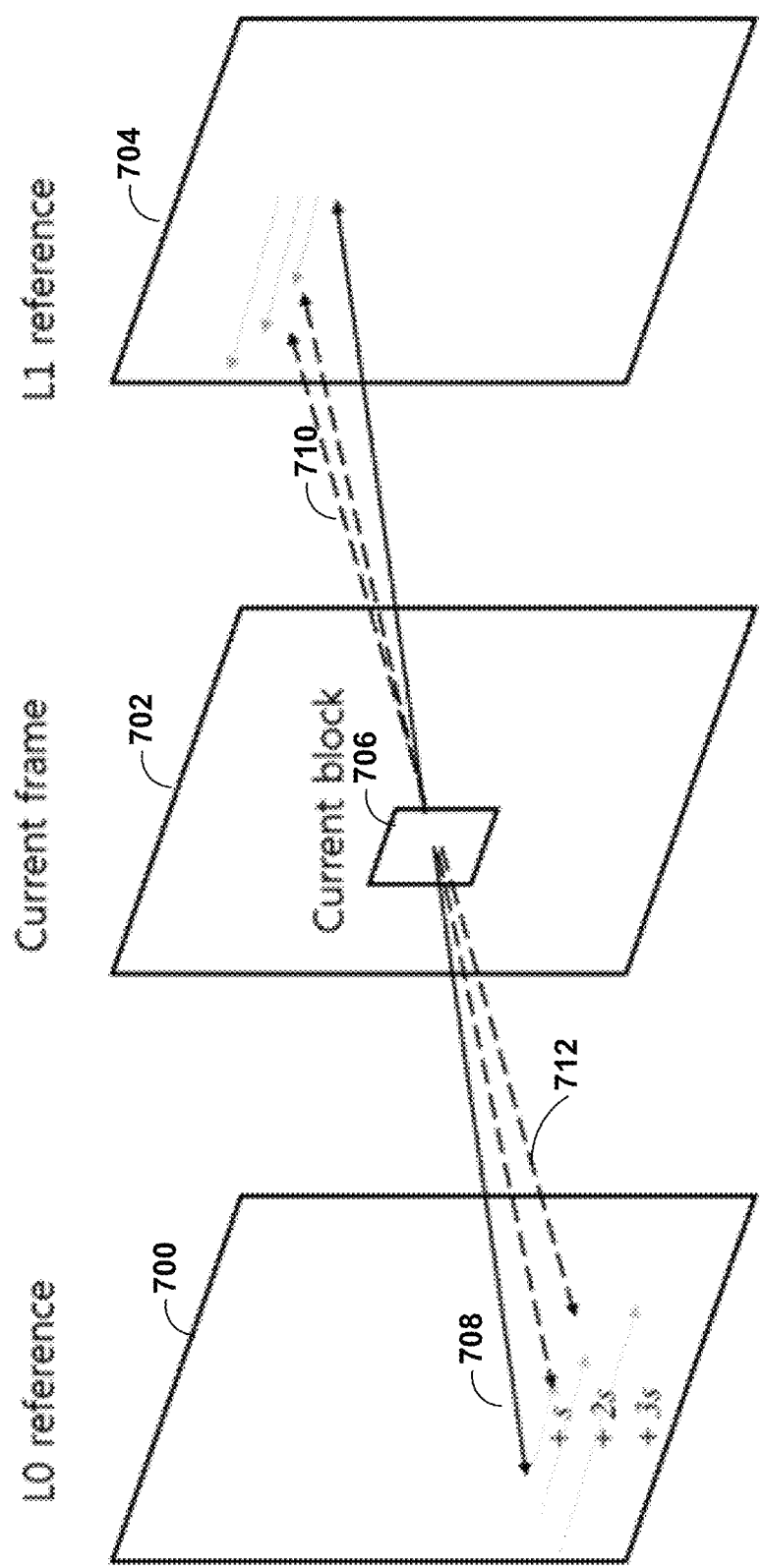
FIG. 7 is a conceptual diagram illustrating an example UMVE search process.

FIG. 7 is a conceptual diagram illustrating an example UMVE search process. As shown in FIG. 7, a motion vector 708 for current block 706 in current frame 702 may be modified in terms of both motion magnitude and motion direction. As will be explained in more detail below, different changes in motion magnitude and motion direction may produce different motion vectors (e.g., motion vector 710 or motion vector 712). Motion vectors 710 and 712 may be called a merge candidate (in this case motion vector 708) with a UMVE (or simply a UMVE candidate). That is, motion vectors 710 and 712 are created by altering motion vector 708 with a UMVE.

Figure 8:
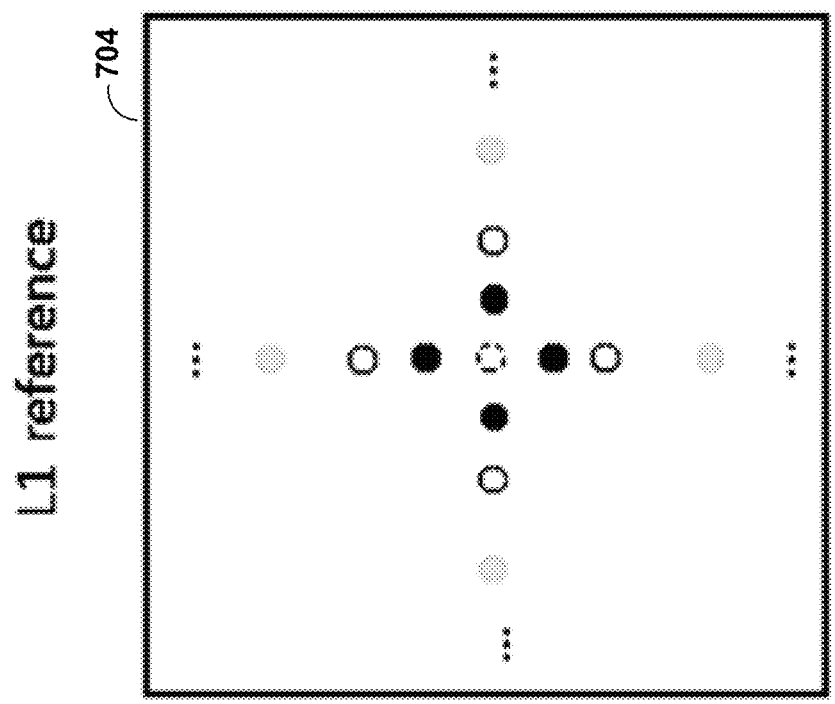
FIG. 8 is a conceptual diagram illustrating example UMVE search points.
Figure 8:
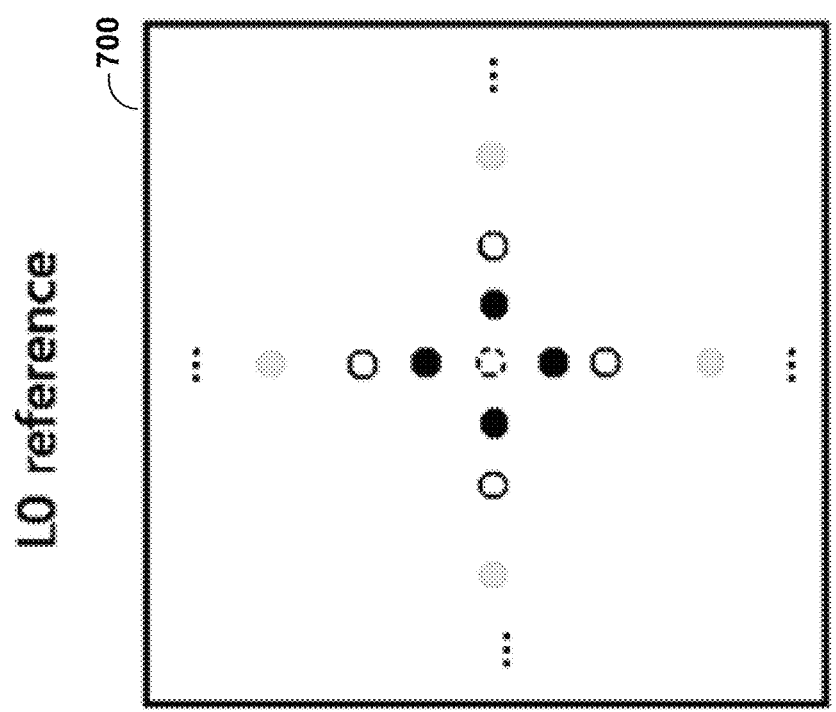

Motion vector 708 may also have different prediction directions. Prediction direction information indicates a prediction direction among L0 (frame 700), L1 (frame 704), and L0 and L1 predictions. For a B slice, using the proposed UMVE techniques, video encoder 200 and video decoder 300 can generate bi-prediction candidates from merge candidates with uni-prediction by using a mirroring technique, as shown in FIG. 7 and FIG. 8. FIG. 8 is a conceptual diagram illustrating example UMVE search points. For example, if a merge candidate is a uni-prediction candidate with reference list L1, video encoder 200 and video decoder 300 may determine a reference index of reference list L0 by searching a reference picture in list 0, which is mirrored with the reference picture for list 1. If there is no corresponding picture, video encoder 200 and video decoder 300 uses the nearest reference picture to current picture. Video encoder 200 and video decoder 300 may derive the motion vector of L0 (frame 700) by scaling the motion vector of L1 (frame 704). Video encoder 200 and video decoder 300 may calculate the scaling factor using a picture order count (POC) distance.

If the prediction direction of the UMVE candidate (i.e., the merge candidate with a UMVE) is the same as one of the original merge candidates, video encoder 200 may signal the index with the value of 0 as a UMVE prediction direction. However, if the prediction direction of the UMVE candidate is not the same as one of the original merge candidates, video encoder 200 may signal the index with a value of 1. After sending the first bit, video encoder 200 may signal the remaining prediction direction based on a pre-defined priority order of UMVE prediction directions. An example priority order is L0/L1 prediction, L0 prediction and L1 prediction.

If the prediction direction of a merge candidate is L1, signaling '0' is for UMVE prediction direction L1. Signaling '10' is for UMVE prediction direction L0 and L1. Signaling '11' is for UMVE prediction direction L0.

If the L0 and L1 prediction lists are the same, video encoder 200 does not signal the UMVE prediction direction information.

TABLE 1

Base candidate IDX

| | Base candidate IDX | | | |
|---|---|---|---|---|
| | 0 | 1 | 2 | 3 |
| $N^{th}$ Motion Vector Predictor (MVP) | $1^{st}$ MVP | $2^{nd}$ MVP | $3^{rd}$ MVP | $4^{th}$ MVP |

A base candidate index in Table 1 defines the starting point. A base candidate index indicates the best candidate among candidates in the list. If the number of base candidates is equal to 1, video encoder 200 does not signal a base candidate IDX.

TABLE 2

Distance IDX

| | Distance IDX | | | | | | | |
|---|---|---|---|---|---|---|---|---|
| | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

The distance index in Table 2 is motion magnitude information. The distance index indicates the pre-defined distance from the starting point information. The value of the distance IDX indicates the magnitude by which video decoder 300 may alter the base candidate (e.g., from the merge candidate list). The direction by which the video decoder 300 alters the base candidate is indicated by the direction IDX.

TABLE 3

Direction IDX

| | Direction IDX | | | |
|---|---|---|---|---|
| | 00 | 01 | 10 | 11 |
| x-axis | + | − | N/A | N/A |
| y-axis | N/A | N/A | + | − |

The direction index in Table 3 represents the direction of the motion vector difference (MVD) relative to the starting point. That is, the direction IDX indicates in which manner the distance IDX should be added to or subtracted from the X or Y component of the base candidate. As can be seen from Table 3, the direction index can represent the four directions: up, down, left, and right.

Video encoder 200 may signal a UMVE flag after sending a skip flag and merge flag. If the skip and merge flag is true, video decoder 300 will then parse the UMVE flag. If the UMVE flage is equal to 1, video decoder 300 will then parse the UMVE syntax elements. However, if the UMVE flage is not 1, video decoder 300 will parse the AFFINE flag. If the AFFINE flag is equal to 1, that indicates AFFINE mode is used. If the AFFINE flag is not 1, video decoder 300 will parse the skip/merge index d to determine skip/merge mode (e.g., as in VVC test model (VTM)).

An additional line buffer due to UMVE candidates is not needed. This is because a skip/merge candidate is directly used as a base candidate. Using an input UMVE index, video decoder 300 may determine the supplement of the motion vector (e.g., the UMVE) right before motion compensation. There is no need to hold a long line buffer for this.

UMVE with Different Directional Information Sets

The enhanced UMVE of T. Hashimoto, E. Sasaki, T. Ikai, "Non-CE4: Enhanced ultimate motion vector expression", JVET-L0355, October 2018 proposed two changes to extend the UMVE of S. Jeong, M. W. Park, Y. Piao, M. Park, K. Choi, "CE4 Ultimate motion vector expression (Test 4.5.4)", JVET-L0054, October 2018, as follows:
1) Increases the number of directions from 4 into 8.
2) Use multiple distance lists.

TABLE 4

Motion direction

| | Direction IDX | | | | | | | |
|---|---|---|---|---|---|---|---|---|
| | 000 | 001 | 010 | 011 | 100 | 101 | 110 | 111 |
| x-axis | +1 | −1 | 0 | 0 | +½ | −½ | −½ | +½ |
| y-axis | 0 | 0 | +1 | −1 | +½ | −½ | +½ | −½ |

The direction index in Table 4 represents 8 directions. The value of the x-axis and the y-axis of the diagonal direction are half of that of horizontal and vertical direction, respectively.

TABLE 5

First distance list

| | Distance IDX | | | |
|---|---|---|---|---|
| | 0 | 1 | 2 | 3 |
| Pixel distance | ¼-pel | ½-pel | ¾-pel | 5/4-pel |

TABLE 6

Second distance list

| | Distance IDX | | | |
|---|---|---|---|---|
| | 0 | 1 | 2 | 3 |
| Pixel distance | 1-pel | 2-pel | 4-pel | 8-pel |

Considering the amount of distance (motion differences) that would be different from the area and sequence characteristics, two sets of distance lists may be used. The selection flag for the list is context coded, thus may be signaled in a more optimal way. The proposed method of JVET-L0355 changed the number of lists from 1 to 2. The two distance lists are in Table 5 and Table 6 above.

Another enhanced UMVE technique, as described in J. Li, R.-L. Liao, C. S. Lim, "CE4-related: Improvement on ultimate motion vector expression", JVET-L0408, October 2018, proposed three changes to extend the UMVE techniques of S. Jeong, M. W. Park, Y. Piao, M. Park, K. Choi, "CE4 Ultimate motion vector expression (Test 4.5.4)", JVET-L0054, October 2018, as follows:

1) Increased the number of directions from 4 into 8.
2) Used two adaptive distance tables
3) Full pixel search point for large distance values

TABLE 7

Original UMVE direction table

| | Direction IDX | | | |
|---|---|---|---|---|
| | 00 | 01 | 10 | 11 |
| x-axis | + | − | N/A | N/A |
| y-axis | N/A | N/A | + | − |

TABLE 8

Additional directional information table

| | Direction IDX | | | |
|---|---|---|---|---|
| | 00 | 01 | 10 | 11 |
| x-axis | + | − | + | − |
| y-axis | + | − | − | + |

Figure 9:
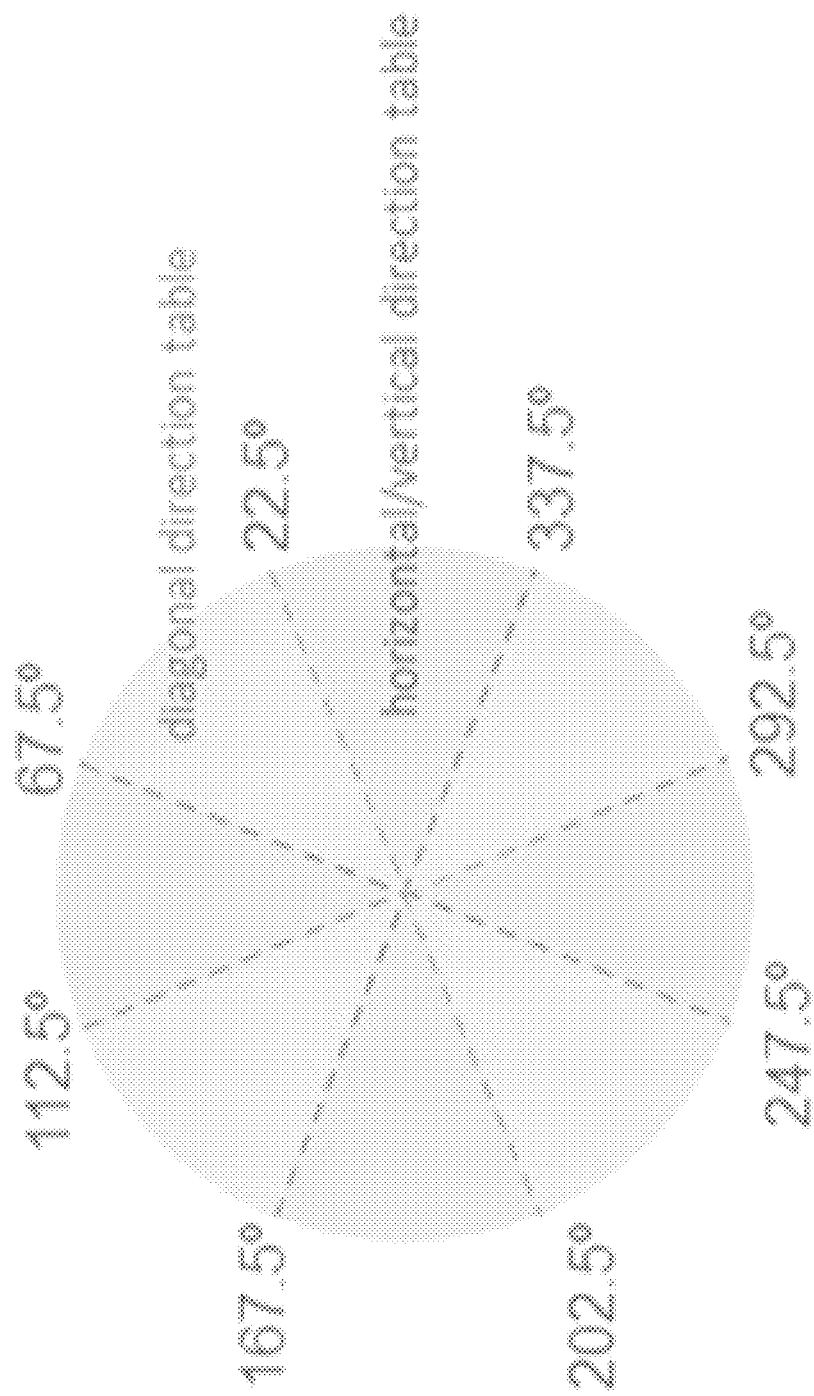
FIG. 9 is a conceptual diagram illustrating direction table selection.

An additional direction in Table 8, which supports diagonal directions, was added to the UMVE techniques of [0157]. One of the two direction tables is selected based on the angle of the base motion vector candidate. If angle angular of the base motion vector candidate is within [22.5°, 67.5°], [112.5°, 157.5°], [202.5°, 247.5°] or [292.5°, 337.5°], the diagonal direction table in Table 8 is used. Otherwise, the horizontal/vertical direction table in Table 7 is used. An illustration of direction table selection is shown in FIG. 9.

TABLE 9

CE4.5.4 UMVE distance table

| | Distance IDX | | | | | | | |
|---|---|---|---|---|---|---|---|---|
| | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

TABLE 10 proposed additional UMVE distance table

| | Distance IDX | | | | | | | |
|---|---|---|---|---|---|---|---|---|
| | 0 | 1 | 2 | 3 | 4 | 5 | 6 | 7 |
| Pixel distance | 1-pel | 2-pel | 4-pel | 8-pel | 16-pel | 32-pel | 64-pel | 128-pel |

The UMVE techniques of S. Jeong, M. W. Park, Y. Piao, M. Park, K. Choi, "CE4 Ultimate motion vector expression (Test 4.5.4)", JVET-L0054, October 2018 uses one fixed distance table, as in Table 9, for generating UMVE search points. In addition to Table 9, this enhanced UMVE of JVET-L0054 uses another adaptive distance table in Table 10 for two approaches: (1) picture resolution adaptive distance table and (2) occurrence-based distance table reordering.

Picture Resolution Adaptive Distance Table

If the picture resolution is not larger than 2K, i.e., 1920× 1080, Table 9 is used as a base distance table. Otherwise, Table 10 is used as a base distance table.

Occurrence-Based Distance Table Reordering

A distance index is reordered according to the occurrence of usage of each distance index in previously coded pictures, ranking from high to low. For example, assuming Table 9 is used as a base distance table and 2-pel is used most times in a previously coded picture, 2-pel distance will be assigned to index 0 instead of 2.

To reduce complexity, the enhanced UMVE candidate values are modified so that the CU using UMVE mode use full-pixel instead of sub-pixel motion vector resolution if the UMVE distance is greater than a threshold. In one example implementation, 16-pixel distance is used as the threshold.

History-Based Motion Prediction

History-based motion vector prediction (HMVP) (e.g., as described in L. Zhang, K. Zhang, H. Liu, Y. Wang, P. Zhao, and D. Hong, "CE4-related: History-based Motion Vector Prediction", JVET-K0104, July 2018) involves keeping a table for previously-decoded motion vectors as HMVP candidates. In some examples, video encoder 200 and video decoder 300 may be configured to update the HMVP table when decoding a non-affine inter-coded block (e.g., a block coded suing a normal, translational motion vector). Video encoder 200 and video decoder 300 may add the retrieved motion vector as a new HMVP candidate to the last entry of a buffer or other memory storing the HMVP table. In some examples, video encoder 200 and video decoder 300 may apply a First-In-First-Out (FIFO) or constraint FIFO rule to add or remove candidates in the HMVP table. Video encoder 200 and video decoder 300 may be configured to use the candidates in the HMVP table for a merge candidate list or an AMVP candidate list. In one example, artificial motion vectors, including combined and zero candidates, can be replaced by the candidates in the HMVP table.

In some examples, video encoder 200 and video decoder 300 may be configured to empty the HMVP table when a processing a new slice. That is, in some examples, video encoder 200 and video decoder 300 may be configured to remove all entries in the HMVP table when coding a new slice. If a block is coded with merge/skip or AMVP mode, video encoder 200 and video decoder 300 may be configured to construct a merge candidate list or AMVP candidate list for the block. If the available candidate number in the list is less than the pre-defined maximum limit, video encoder 200 and video decoder 300 may be configured to use the candidates in HMVP table to fill out the candidate list. If there is a non-affine inter-coded block (e.g., a block coded using regular inter prediction), video encoder 200 and video decoder 300 may be configured to add the motion vector associated with that block to the last entry of the HMVP table. Video encoder 200 and video decoder 300 may be configured to update the HMVP table after adding new candidates.

Figure 10:
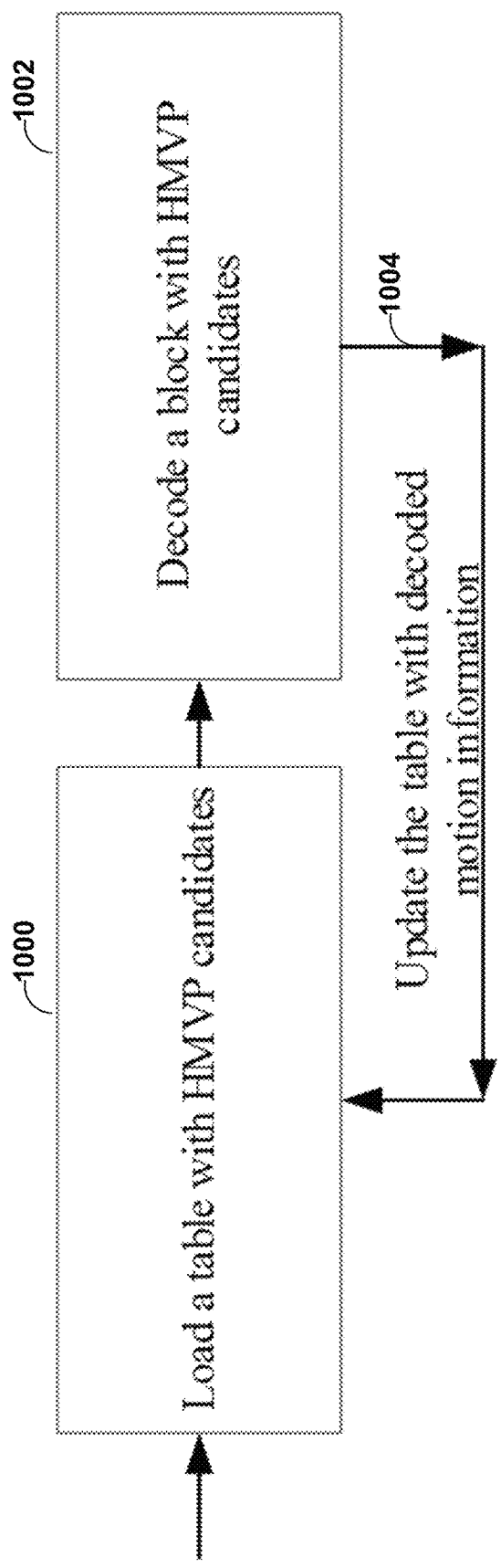
FIG. 10 is a flowchart showing an decoding flowchart using history-based motion vector predictor (HMVP).

The overall decoding flow when using HMVP is depicted in FIG. 10. As shown in FIG. 10, video decoder 300 may load a table with HMVP candidates (1000). Video decoder 300 may then decode a block of video data using the HMVP candidates (1002). For example, video decoder 300 may generate a merge or AMVP candidate list using candidates from the HMVP table. Video decoder 300 may determine motion information (e.g., a motion vector, reference picture index, and/or reference picture list) for the current block from the merge or AMVP candidate list and then may decode the block of video data using the determined motion information. Video decoder 300 may then update the HMVP table with the decoded motion information (1004). For example, video decoder 300 may add the motion information for the decoded block of video data to the HMVP table. Video decoder 300 may then remove one or more candidates from the HMVP table using a predetermined rule, such as the FIFO rule or FIFO constraint rule described below.

Figure 11A:
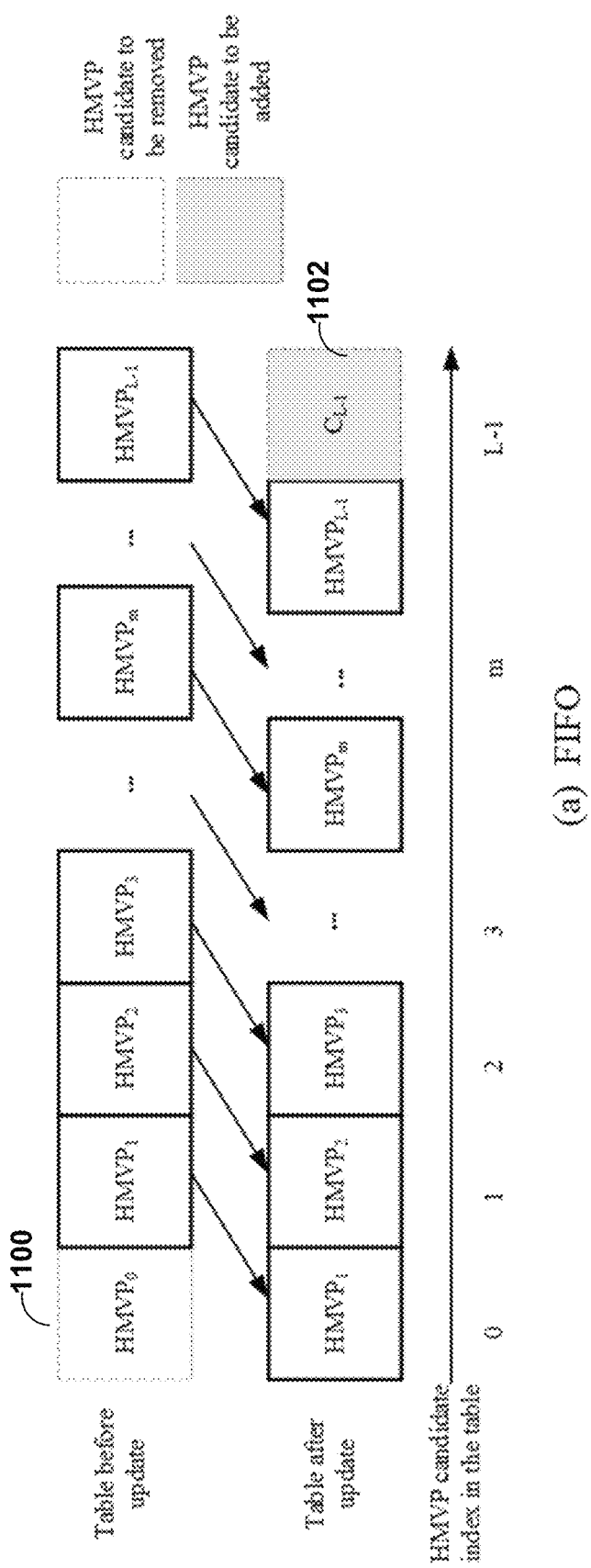
FIG. 11A is a conceptual diagram showing a table update process for a first-in, first-out (FIFO) buffer for HMVP.

Assuming the HMVP table size is L, in some examples, video encoder 200 and video decoder 300 may apply the First-In-First-Out (FIFO) rule shown in FIG. 11A when adding a new candidate to the table containing S HMVP candidates. As shown in FIG. 11A, the HMVP table, before updating, includes HMVP candidates $HMVP_0$ through $HMVP_{L-1}$. The HMVP candidate 1100 ($HMVP_0$) to be removed is shown with white shading and a dashed outline. The HMVP candidate 1102 ($C_{L-1}$) to be added is shown with gray shading and a dashed outline. During the update process, video encoder 200 and video decoder 300 adds the new candidate 1102 ($C_{L-1}$) to the final entry of the HMVP table (arranged as a FIFO) and removes the candidate 1100 ($HMVP_0$) in the first entry. As such, the HMVP table always contains the L newest candidates.

Figure 11B:
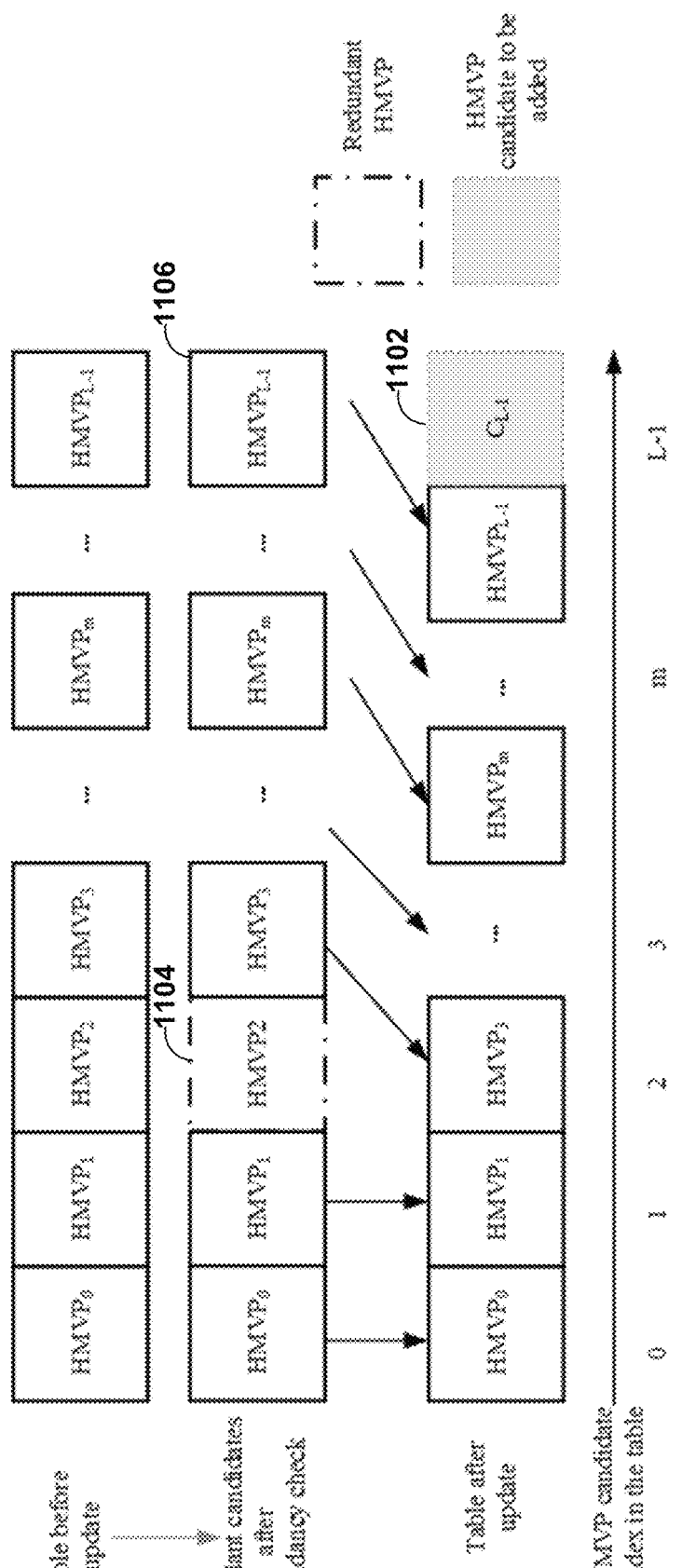
FIG. 11B is a conceptual diagram showing a table update process for a constraint FIFO buffer for HMVP.

The FIFO rule may cause the HMVP table to include redundant candidates (e.g., candidates with the same motion information). In other examples, video encoder 200 and video decoder 300 may use a constraint FIFO rule, as shown in FIG. 11B, to address the problem of redundant candidates. The constraint FIFO rule includes a pruning process. Before adding the new candidate 1102 ($C_{L-1}$), video encoder 200 and video decoder 300 may remove redundant candidates in the table. In FIG. 8B, the redundant candidates are shaded in white with a dot-dash outline. In the example of FIG. 11B, candidate 1104 ($HMVP_2$) is identical to a later added candidate (e.g., candidate 1106 ($HMVP_{L-1}$). Video encoder 200 and video decoder 300 may move the candidates located after the removed candidate 1104 forward to fill the empty entry. Then, video encoder 200 and video decoder 300 may add the new candidate 1102 ($C_{L-1}$) to the last entry of the HMVP table.

As discussed above, video encoder 200 and video decoder 300 may use HMVP candidates in the merge candidate list construction process. Video encoder 200 and video decoder 300 may insert HMVP candidates from the last entry to the first entry in the HMVP table after the TMVP candidate. In one example, video encoder 200 and video decoder 300 may be configured to apply a pruning process to the HMVP candidates. In one example, video encoder 200 and video decoder 300 may continue to insert HMVP candidates to the merge candidate list until the merge candidate number reaches a predefined maximum limit.

Similarly, video encoder 200 and video decoder 300 may use HMVP candidates in the AMVP candidate list construction process. Video encoder 200 and video decoder 300 may insert the last K HMVP candidates to the AMVP candidate list after the TMVP candidate. In one example, the inserted HMVP candidate must have the same reference picture as that of AMVP. Video encoder 200 and video decoder 300 may also apply a pruning process on the HMVP candidates.

As described above, video encoder 200 and video decoder 300 may be configured to use UMVE for either skip or merge modes. In some examples, UMVE techniques reuse merge candidate which may be the same as the merge candidate used in VVC. Among the merge candidates, video encoder 200 may select a candidate and may further expand the selected candidate with a UMVE method, thus creating a UMVE candidate (i.e., the merge candidate with a UMVE). The UMVE candidate, as introduced above, is composed both distance information and direction information that is used to modify the selected candidate. For a merge candidate list, one candidate in the list may be expressed by one of the previous candidates in the list with a UMVE (e.g., is a UMVE candidate of a previous merge candidate). That is, some candidates in the merge candidate list may be the same as a previous candidate expanded with a UMVE. Thus, calculating a UMVE candidate for such a candidate may cost time, but may provide little coding gain. Furthermore, such a merge candidate may also have a higher merge index value due to a large number of previous merge candidates in the merge candidate lists. Coding a merge index and a UMVE candidate index also may result in a higher bit rate.

For the history table, a HMVP candidate may be also expressed by another HMVP candidate with a UMVE (e.g., an UMVE candidate of an HMVP candidate). As such, adding this HMVP candidate to the merge candidate lists may also encounter the same problems as above.

When adding an HMVP candidate from history table to a merge candidate list, video encoder 200 and video decoder 300 may be configured to perform a pruning check to all merge candidates in the list. This check makes sure that the added HMVP candidate will not be a redundant merge candidate (i.e., the same as a previously-added candidate) after adding to the merge candidate list. However, this pruning check may go through all merge candidates and may cost additional time.

Example techniques for HMVP selects last N HMVP candidates and adds them to the merge candidate list. The subsampling HMVP, as described in W.-J. Chien, Y. Han, H. Huang, C.-C. Chen, M. Karczewicz, "CE4-related: Modification on History-based Mode Vector Prediction", JVET-L0401, October 2018, selects one out of every four HMVP candidates and adds them to the merge candidate list. In some examples, the selected subsampling HMVP candidates may also be pruned by checking all merge candidates in the list.

Some example HMVP techniques involve checking redundant HMVP candidates when adding a new HMVP candidate to the history table. The pruning check may go through all HMVP candidates in the history table. This pruning check can be time consuming and may slow encoder and decoder throughput.

To address the problems mentioned above, the following methods are proposed. Any combination of the following techniques may be used together.

In one example, if one merge candidate (motion vector candidate) can be expressed by one of the previous merge candidates in the candidate list with a UMVE, video encoder 200 may be configured to skip this merge candidate's UMVE calculation. That is, when determining what merge candidate to select and whether or not to use UMVE for the merge candidate, video encoder 200 may be configured to test merge candidates in the merge candidate list in a specific order. After testing, video encoder 200 may select the merge candidate or merge candidate with UMVE (e.g., a particular UMVE candidate) that provides the best rate-distortion results. However, in some examples, one merge candidate in the list may be identical to a previously-considered UMVE candidate (i.e., a previous merge candidate with UMVE). In this case, video encoder 200 may be configured to skip testing such a merge candidate and skip calculating UMVE candidates for this merge candidate. This is because testing and calculating a UMVE candidate for such a merge candidate is highly likely to be redundant to the previously-considered merge candidate.

Accordingly, in one example of the disclosure, video encoder 200 may be configured to determine if a current motion vector candidate in the candidate list can be expressed by a previous motion vector candidate with a UMVE, and skip a calculation of the UMVE for the current motion vector candidate based on the determination.

Consider the following example. Video encoder 200 may construct a merge candidate list that includes n merge candidates (MV1, MV2, . . . , MVn). Video encoder 200 may be configured to calculate and test the UMVE candidates for each merge candidate in the list to determine the best candidate. As described above, video encoder 200 may calculate multiple UMVE candidates for each merge candidate. As such, each candidate in the merge candidate list may represent a group of possible candidates, each candidate of the group with a different UMVE. If MVj in the merge candidate list is equal to any of the UMVE candidates of a previously-considered merge candidate MVi, video encoder 200 will skip testing MVj and skip calculation of the UMVE candidates for MVj. In this example, MVj is tested after MVi (i.e., MVi comes first in the checking order).

Figure 12:
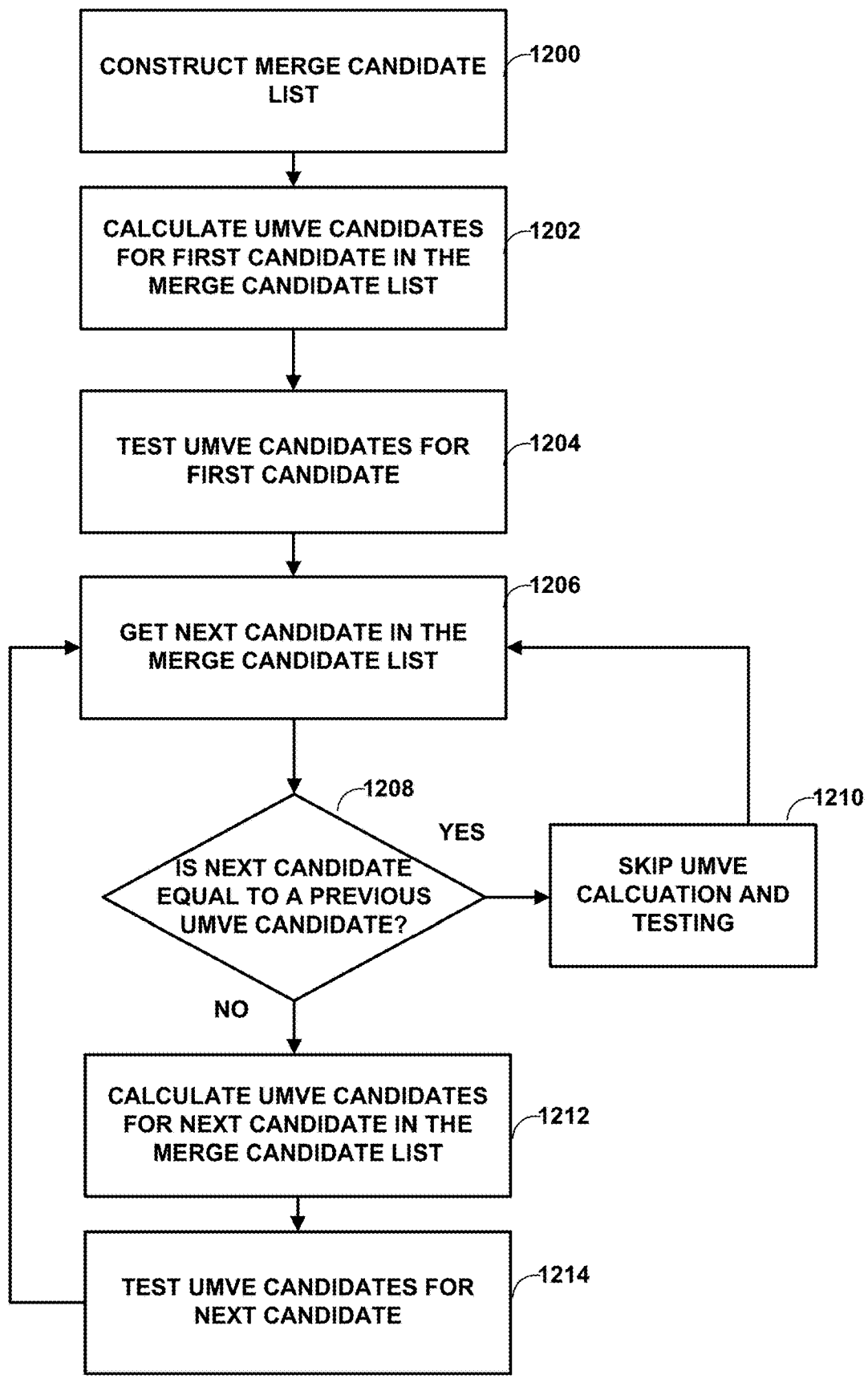
FIG. 12 is a flowchart illustrating an example encoding method.

FIG. 12 is a flowchart showing an example encoding process according to one example of the disclosure. In some examples, the techniques of FIG. 12 may be performed by UMVE pruning unit 225 of FIG. 3. In other examples, the techniques of FIG. 12 may be performed by one or more other structural units of motion estimation unit 222 and video encoder 200. As shown in FIG. 12, video encoder 200 may be configured to construct a merge candidate list (1200). Video encoder 200 may be further configured to calculate UMVE candidates for a first candidate (e.g., first motion vector candidate) in the merge candidate list (1202) and test the UMVE candidates (e.g., a rate-distortion test) for the first candidate (1204). Video encoder 200 may then get the next candidate in the merge candidate list (1206).

At this point, video encoder 200 may then determine if the next candidate is equal to a previous UMVE candidate (1208). If yes, video encoder 200 may skip UMVE calculation and testing for the next merge candidate (1210). Video encoder 200 will then get the next candidate in the merge candidate list (1206). If no, video encoder 200 may calculate UMVE candidates for the next candidate in the merge candidate list (1212) and test the UMVE candidates for the first candidate (1214). Video encoder 200 may then get the next candidate in the list 1206. After all UMVE calculations and testing of the merge candidate list, video encoder 200 will select the best UMVE candidate and code the block of video data with the selected UMVE candidate.

In other examples of the disclosure, both video encoder 200 and video decoder 300 may be configured to construct one or more candidate lists (e.g., history tables for HMVP and merge candidate lists) based on the UMVE candidate of a candidate to be added and/or the UMVE candidate of a previously-added candidate. In particular, video encoder 200 and video decoder 300 may be configured to add or not add (e.g., prune) candidate lists based on UMVE candidates of various candidates. In this way, redundant or potentially redundant candidates may not be added to candidates lists. In general, video encoder 200 and video decoder 300 may be configured to add one or more motion vector candidates to a candidate list for motion vector prediction for a current block of the video data, determine whether to add a next motion vector candidate to the candidate list based on an ultimate motion vector expression (UMVE) candidate of a respective candidate of the one or more candidates, and encode/decode the current block of the video data using the candidate list.

In one example of the disclosure, the candidate list is a merge candidate list and the next motion vector candidate is an HMVP candidate from a history table. In this example, when adding an HMVP candidate from the history table to the merge candidate list, video encoder 200 and video decoder 300 may be configured to perform pruning on all merge candidates until encountering a matched candidate (e.g., a candidate in the merge list that matches an HMVP candidate). If this added HMVP candidate can be expressed by a merge candidate already in the list with a UMVE (i.e., a UMVE candidate of a merge candidate already in the merge candidate list), video encoder 200 and video decoder 300 may be configured to discard (e.g., prune) this HMVP candidate and terminate any remaining pruning checks. This technique may reduce the number of pruning checks.

Accordingly, in one example of the disclosure, to determine whether to add an HMVP candidate to a merge candidate list based on the ultimate motion vector expression of a candidate already in the merge candidate list, video encoder 200 and video decoder 300 may be configured to perform pruning of the HMVP candidate using the one or more candidates in the merge candidate list, terminate the pruning if the HMVP candidate matches the UMVE candidate of a candidate already in the merge candidate list, and discard the HMVP candidate.

In another example, when performing subsampling HMVP techniques, video encoder 200 and video decoder 300 may be configured to select a subset of HMVP candidates to add to a merge candidate list. The subset of HMVP candidates may include{Sub_HMVP_1, Sub_HMVP_2, . . . , Sub_HMVP_n}. Sub_HMVP_i (i=1~n) is the ith selected HMVP candidate form the history table. If Sub_HMVP_i (i=2~n) can be expressed by Sub_HMVP_1 with a UMVE (i.e., UMVE candidate of Sub_HMVP_1), video encoder 200 and video decoder 300 will not add Sub_HMVP_i will to the merge candidate list. This method helps by discarding unneeded subsampling HMVP candidates (Sub_HMVP_i) immediately after selecting such a candidate from the history table. This technique may reduce the number of pruning checks.

In one example, each Sub_HMVP_i will be pruned with only Sub_HMVP_1 but not all merge candidates. That is, the one or more candidates already in the merge candidate list includes a first subsampling HMVP candidate (Sub_HMVP_1), where the first subsampling HMVP candidate is a first candidate selected from a history table. The next motion vector candidate is a second subsampling HMVP candidate (e.g., Sub_HMVP_i) is selected from the history table after the first subsampling HMVP candidate. In this example, to determine whether to add the second subsampling HMVP candidate to the merge candidate list based on the ultimate motion vector expression of the first subsampling HMVP candidate, video encoder 200 and video decoder 300 are configured to perform pruning of the second subsampling HMVP candidate using the first subsampling HMVP candidate, and discard the second subsampling HMVP candidate if the second subsampling HMVP candidate matches the UMVE candidate of the first subsampling HMVP candidate.

In another example, when adding a new HMVP candidate to the history table, video encoder 200 and video decoder 300 may be configured to only prune the new HMVP candidate with the last HMVP candidate. That is, video encoder 200 and video decoder 300 may be configured to prune new HMVP candidates with the most previously added candidate to the HMVP table (i.e., the last HMVP candidate). If the new HMVP candidate can be expressed by the last HMVP candidate with a UMVE (e.g., a UMVE candidate of the last HMVP candidate), video encoder 200 and video decoder 300 may be configured to discard this new HMVP candidate. Otherwise, video encoder 200 and video decoder 300 may be configured to add this new HMVP candidate to history table. This technique uses only one pruning when updating the history table, thus improving encoder and decoder throughput. This technique also confirms that the HMVP candidates in the table have a higher variety (e.g., fewer redundant candidates).

In the foregoing example of the disclosure, the candidate list is a history table for history-based motion vector predictor (HMVP) candidates. To determine whether to add the next HMVP candidate to the history table, video encoder 200 and video decoder 300 are configured to prune the current HMVP candidate relative to the UMVE candidate of a last HMVP candidate.

In view of the foregoing, the techniques of this disclosure may improve the field of video coding at least because, in various examples, video encoder 200 and video decoder 300 may perform fewer processing operations and/or a bitstream that is coded and transferred using these techniques may be coded more efficiently, thereby reducing bandwidth transmission consumption. For example, by skipping UMVE calculation, skipping addition of an HMVP candidate to a merge candidate list, and/or only pruning HMVP candidates from a history after adding a last candidate, fewer processing operations can be performed. Likewise, by pruning candidates from the merge candidate list in this manner may reduce a number of codewords needed for representing index values into the merge candidate list, while also using merge candidates that more accurately identify reference blocks, thereby reducing bitstream size both because merge mode can be used to code a motion vector and because residual values may be smaller.

Figure 13:
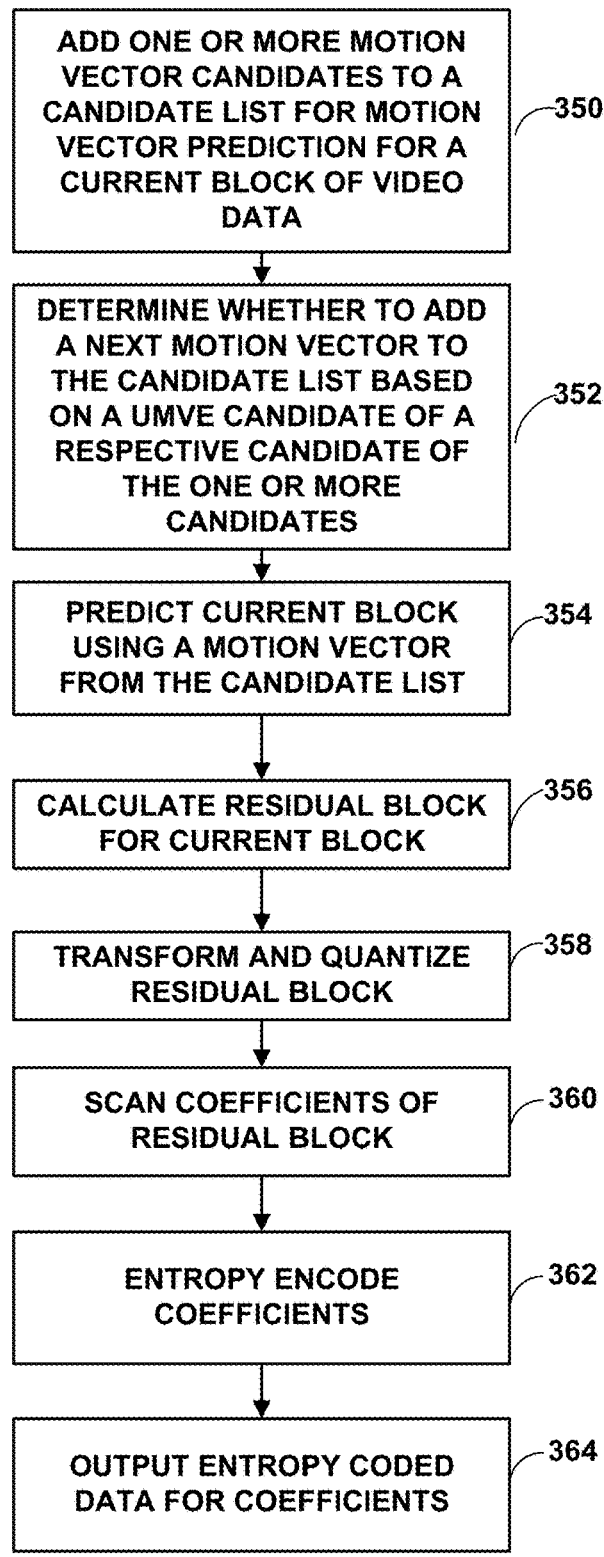
FIG. 13 is a flowchart illustrating another example encoding method.

FIG. 13 is a flowchart illustrating an example method for encoding a current block. The current block may comprise a current CU. Although described with respect to video encoder 200 (FIGS. 1 and 3), it should be understood that other devices may be configured to perform a method similar to that of FIG. 13. In some examples, the techniques of FIG. 13 may be performed by UMVE pruning unit 225 of FIG. 3. In other examples, the techniques of FIG. 13 may be performed by one or more other structural units of motion estimation unit 222 and video encoder 200.

Video encoder 200 may construct a candidate list. For example, video encoder 200 may add one or more motion vector candidates to a candidate list for motion vector prediction for a current block of video data (350). In accordance with the techniques of the disclosure described above, video encoder 200 may determine whether to add a next motion vector to the candidate list based on a UMVE candidate of a respective candidate of the one or more candidates (352).

Video encoder 200 may then predict the current block using a motion vector from the candidate list (354). For example, video encoder 200 may form a prediction block for the current block using the motion vector. Video encoder 200 may then calculate a residual block for the current block (356). To calculate the residual block, video encoder 200 may calculate a difference between the original, uncoded block and the prediction block for the current block. Video encoder 200 may then transform and quantize coefficients of the residual block (358). Next, video encoder 200 may scan the quantized transform coefficients of the residual block (360). During the scan, or following the scan, video encoder 200 may entropy encode the coefficients (362). For example, video encoder 200 may encode the coefficients using CAVLC or CABAC. Video encoder 200 may then output the entropy coded data of the block (364).

Figure 14:
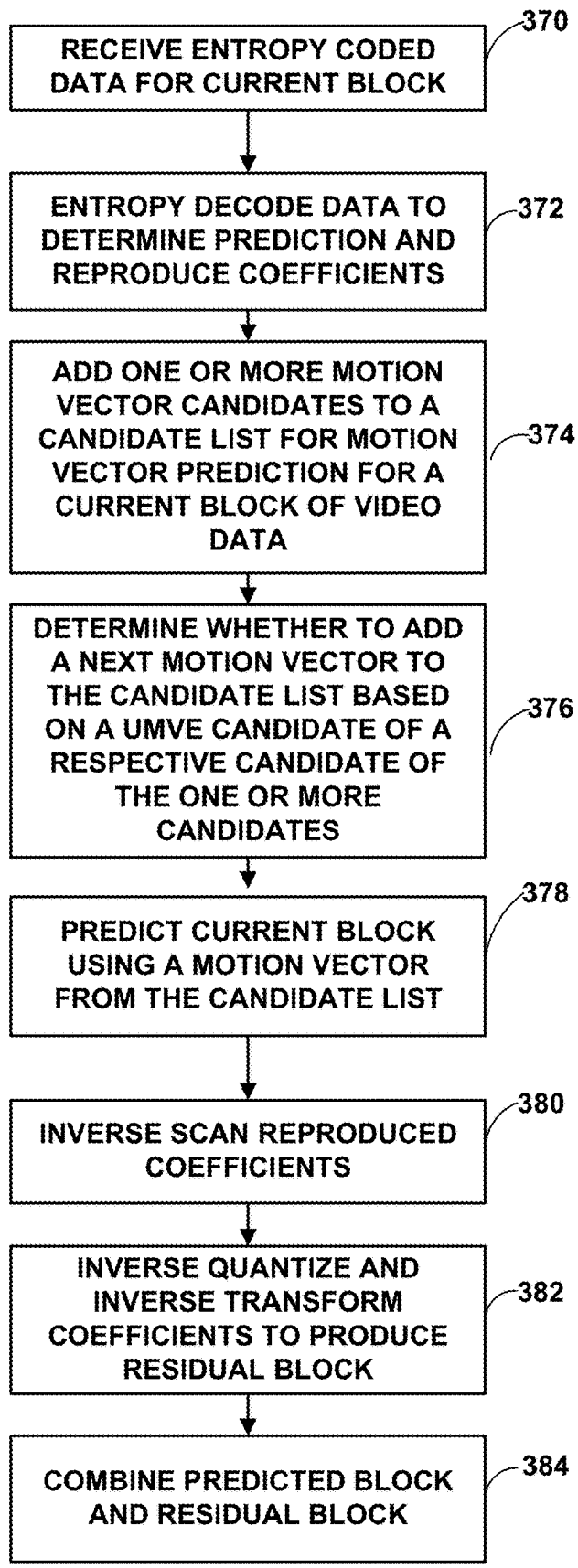
FIG. 14 is a flowchart illustrating an example decoding method.

FIG. 14 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 14. In some examples, the techniques of FIG. 14 may be performed by UMVE pruning unit 317 of FIG. 4. In other examples, the techniques of FIG. 14 may be performed by one or more other structural units of motion compensation unit 316 and video decoder 300.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372).

Video decoder 300 may then construct a candidate list. For example, video decoder 300 may add one or more motion vector candidates to a candidate list for motion vector prediction for a current block of video data (374). In some examples, when generating the candidate list, video decoder 300 may be further configured to generate one or more UMVE candidates for existing candidates retrieved from spatial/temporal neighboring candidates (e.g., the candidates in the candidate list). In accordance with the techniques of the disclosure described above, video decoder 300 may determine whether to add a next motion vector to the candidate list based on a UMVE candidate of a respective candidate of the one or more candidates (376).

Video decoder 300 may then predict the current block (378) using a motion vector from the candidate list as indicated by the prediction information for the current block, to calculate a prediction block for the current block. For example, after having added a first set of candidates from spatial/temporal neighbors to the current block to the list and then generating UMVE candidates for one or more of the candidates, and then having determined that a new spatial/temporal neighbor has a new motion vector candidate that is different than the existing candidates and their UMVE candidates, video decoder 300 may have added the new motion vector candidate to the motion vector predictor list. Thus, video decoder 300 may, assuming an index identifies the new motion vector candidate in the motion vector predictor list, select the new motion vector candidate as a motion vector predictor to be used to predict a motion vector to be used to calculate the prediction block for the current block. Video decoder 300 may then inverse scan the reproduced coefficients (380), to create a block of quantized transform coefficients. Video decoder 300 may then inverse quantize and inverse transform the coefficients to produce a residual block (382). Video decoder 300 may ultimately decode the current block by combining the prediction block and the residual block (384).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus configured to decode video data, the apparatus comprising:
a memory configured to store video data; and
one or more processors implemented in circuitry and in communication with the memory, the one or more processors configured to:
add one or more motion vector candidates to a merge candidate list for motion vector prediction for a current block of the video data;
determine whether to add a next motion vector candidate to the merge candidate list based on an ultimate motion vector expression (UMVE) candidate of a respective candidate of the one or more candidates;
perform pruning of the next motion vector candidate, where the next motion vector candidate is a history-based motion vector prediction (HMVP) candidate, from a history table, using the one or more candidates in the merge candidate list;
terminate the pruning if the HMVP candidate matches the UMVE candidate of the respective candidate of the one or more candidates;
discard the HMVP candidate; and
decode the current block of the video data using the merge candidate list.

2. An apparatus configured to decode video data, the apparatus comprising:
a memory configured to store video data; and
one or more processors implemented in circuitry and in communication with the memory, the one or more processors configured to:
add one or more motion vector candidates to a merge candidate list for motion vector prediction for a current block of the video data;
determine whether to add a next motion vector candidate to the merge candidate list based on an ultimate motion vector expression (UMVE) candidate of a respective candidate of the one or more candidates, wherein the next motion vector candidate is a history-based motion vector prediction (HMVP) candidate from a history table, and wherein the one or more motion vector candidates of the merge candidate list includes a first subsampling HMVP candidate, wherein the first subsampling HMVP candidate is a first candidate selected from the history table, and wherein the next motion vector candidate is a second subsampling HMVP candidate that is selected from the history table after the first subsampling HMVP candidate; and
decode the current block of the video data using the merge candidate list.

3. The apparatus of claim 2, wherein to determine whether to add the second subsampling HMVP candidate to the merge candidate list based on the ultimate motion vector expression of the respective candidate of the one or more candidates, the one or more processors are further configured to:
perform pruning of the second subsampling HMVP candidate using the first subsampling HMVP candidate; and discard the second subsampling HMVP candidate if the second subsampling HMVP candidate matches the UMVE candidate of the first subsampling HMVP candidate.

4. The apparatus of claim 3, wherein to perform pruning of the second subsampling HMVP candidate using the first subsampling HMVP candidate, the one or more processors are further configured to:
perform pruning of the second subsampling HMVP candidate using only the first subsampling HMVP candidate.

5. An apparatus configured to decode video data, the apparatus comprising:
a memory configured to store video data; and
one or more processors implemented in circuitry and in communication with the memory, the one or more processors configured to:
add one or more motion vector candidates to a merge candidate list for motion vector prediction for a current block of the video data;
determine whether to add a next motion vector candidate to the merge candidate list based on an ultimate motion vector expression (UMVE) candidate of a respective candidate of the one or more candidates, and wherein the merge candidate list is a history table for history-based motion vector predictor (HMVP) candidates, wherein the next motion vector candidate is a current HMVP candidate;
prune the current HMVP candidate relative to the UMVE candidate of a last HMVP candidate; and
decode the current block of the video data using the merge candidate list.

6. The apparatus of claim 1, further comprising:
a display configured to display a picture that includes the decoded current block of the video data.

7. A method of decoding video data, the method comprising:
adding one or more motion vector candidates to a merge candidate list for motion vector prediction for a current block of video data;
determining whether to add a next motion vector candidate to the merge candidate list based on an ultimate motion vector expression (UMVE) candidate of a respective candidate of the one or more candidates;
pruning of the next motion vector candidate, where the next motion vector candidate is a history-based motion vector prediction (HMVP) candidate, from a history table, using the one or more candidates in the merge candidate list;
terminating the pruning if the HMVP candidate matches the UMVE candidate of the respective candidate of the one or more candidates; and
discarding the HMVP candidate; and
decoding the current block of video data using the merge candidate list.

8. A method of decoding video data, the method comprising:
adding one or more motion vector candidates to a merge candidate list for motion vector prediction for a current block of video data;
determining whether to add a next motion vector candidate to the merge candidate list based on an ultimate motion vector expression (UMVE) candidate of a respective candidate of the one or more candidates, wherein the next motion vector candidate is a history-based motion vector prediction (HMVP) candidate from a history table, and wherein the one or more candidates of the merge candidate list includes a first subsampling HMVP candidate, wherein the first subsampling HMVP candidate is a first candidate selected from the history table, and wherein the next motion vector candidate is a second subsampling HMVP candidate that is selected from the history table after the first subsampling HMVP candidate.

9. The method of claim 8, wherein determining whether to add the second subsampling HMVP candidate to the merge candidate list based on the ultimate motion vector expression of the respective candidate of the one or more candidates comprises:
performing pruning of the second subsampling HMVP candidate using the first subsampling HMVP candidate; and
discarding the second subsampling HMVP candidate if the second subsampling HMVP candidate matches the UMVE candidate of the first subsampling HMVP candidate.

10. The method of claim 9, wherein performing pruning of the second subsampling HMVP candidate using the first subsampling HMVP candidate comprises:
performing pruning of the second subsampling HMVP candidate using only the first subsampling HMVP candidate.

11. A method of decoding video data, the method comprising:
adding one or more motion vector candidates to a merge candidate list for motion vector prediction for a current block of video data;
determining whether to add a next motion vector candidate to the merge candidate list based on an ultimate motion vector expression (UMVE) candidate of a respective candidate of the one or more candidates, and wherein the merge candidate list is a history table for history-based motion vector predictor (HMVP) candidates; and
pruning the current HMVP candidate relative to the UMVE candidate of a last HMVP candidate.

12. The method of claim 7, further comprising:
displaying a picture that includes the decoded current block of the video data.

13. An apparatus configured to encode video data, the apparatus comprising:
a memory configured to store video data; and
one or more processors implemented in circuitry and in communication with the memory, the one or more processors configured to:
add one or more motion vector candidates to a merge candidate list for motion vector prediction for a current block of the video data;
determine whether to add a next motion vector candidate to the merge candidate list based on an ultimate motion vector expression (UMVE) candidate of a respective candidate of the one or more candidates;
determine if a current motion vector candidate in the merge candidate list can be expressed by a previous motion vector candidate with a UMVE candidate; and
skip a calculation of the UMVE candidate for the current motion vector candidate based on the determination that the current motion vector candidate can be expressed by the previous motion vector candidate with the UMVE candidate; and
encode the current block of the video data using the merge candidate list.

14. The apparatus of claim 13, wherein the next motion vector candidate is a history-based motion vector prediction (HMVP) candidate from a history table.

15. The apparatus of claim 14, wherein to determine whether to add the HMVP candidate to the merge candidate list based on the ultimate motion vector expression of the respective candidate of the one or more candidates, the one or more processors are further configured to:
perform pruning of the HMVP candidate using the one or more candidates in the merge candidate list;
terminate the pruning if the HMVP candidate matches the UMVE candidate of the respective candidate of the one or more candidates; and
discard the HMVP candidate.

16. The apparatus of claim 14, wherein the one or more candidates of the merge candidate list includes a first subsampling HMVP candidate, wherein the first subsampling HMVP candidate is a first candidate selected from the history table, and wherein the next motion vector candidate is a second subsampling HMVP candidate that is selected from the history table after the first subsampling HMVP candidate.

17. The apparatus of claim 16, wherein to determine whether to add the second subsampling HMVP candidate to the merge candidate list based on the ultimate motion vector expression of the respective candidate of the one or more candidates, the one or more processors are further configured to:
perform pruning of the second subsampling HMVP candidate using the first subsampling HMVP candidate; and
discard the second subsampling HMVP candidate if the second subsampling HMVP candidate matches the UMVE candidate of the first subsampling HMVP candidate.

18. The apparatus of claim 17, wherein to perform pruning of the second subsampling HMVP candidate using the first subsampling HMVP candidate, the one or more processors are further configured to:
perform pruning of the second subsampling HMVP candidate using only the first subsampling HMVP candidate.

19. The apparatus of claim 13, wherein the candidate list is a history table for history-based motion vector predictor (HMVP) candidates, wherein the next motion vector candidate is a current HMVP candidate, and wherein to determine whether to add the next motion vector candidate to the candidate list, the one or more processors are further configured to:
prune the current HMVP candidate relative to the UMVE candidate of a last HMVP candidate.

20. The apparatus of claim 13, wherein to encode the current block of the video data using the candidate list, the one or more processors are further configured to:
determine if a current motion vector candidate in the candidate list can be expressed by a previous motion vector candidate with a UMVE candidate; and
skip a calculation of the UMVE candidate for the current motion vector candidate based on the determination.

21. The apparatus of claim 13, further comprising:
a camera configured to capture a picture that includes the current block of the video data.

* * * * *